US011886924B2

(12) United States Patent
Sanchez et al.

(10) Patent No.: US 11,886,924 B2
(45) **Date of Patent: *Jan. 30, 2024**

(54) METHODS AND APPARATUS TO HANDLE DEPENDENCIES ASSOCIATED WITH RESOURCE DEPLOYMENT REQUESTS

(71) Applicant: VMware LLC, Palo Alto, CA (US)

(72) Inventors: Sergio Sanchez, Sofia (BG); Georgi Muleshkov, Sofia (BG); Stanislav Asenov Hadjiiski, Sofia (BG); Miroslav Shipkovenski, Sofia (BG); Radostin Georgiev, Sofia (BG)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/941,974

(22) Filed: Sep. 9, 2022

(65) Prior Publication Data

US 2023/0004441 A1 Jan. 5, 2023

Related U.S. Application Data

(63) Continuation of application No. 16/932,521, filed on Jul. 17, 2020, now Pat. No. 11,442,784.

(51) Int. Cl.

| | |
|---|---|
| ***G06F 9/46*** | (2006.01) |
| ***G06F 9/50*** | (2006.01) |
| ***G06F 8/41*** | (2018.01) |
| ***G06F 16/901*** | (2019.01) |

(52) U.S. Cl.

CPC ............ *G06F 9/5055* (2013.01); *G06F 8/433* (2013.01); *G06F 9/5038* (2013.01); *G06F 16/9024* (2019.01)

(58) Field of Classification Search

CPC .... G06F 9/5055; G06F 16/9024; G06F 8/433; G06F 9/5038

See application file for complete search history.

(56) References Cited

U.S. PATENT DOCUMENTS

| | | | |
|---|---|---|---|
| 5,948,066 | A | 9/1999 | Whalen et al. |
| 11,442,784 | B2 | 9/2022 | Sanchez et al. |
| 2010/0017702 | A1 | 1/2010 | Carroll et al. |
| 2020/0183739 | A1 | 6/2020 | Hashimoto et al. |

OTHER PUBLICATIONS

Kubernetes, "Workloads," [https://kubernetes.io/docs], last modified Oct. 15, 2020, 2 pages.

(Continued)

*Primary Examiner* — Gregory A Kessler
(74) *Attorney, Agent, or Firm* — Quarles & Brady LLP

(57) ABSTRACT

An example apparatus includes a dependency graph generator to generate a dependency graph based on a resource request file specifying a first resource and a second resource to deploy to a resource-based service, the dependency graph representative of the first resource being dependent on a second resource, a verification controller to generate a status indicator after a determination that a time-based ordering of a first request relative to a second request satisfies the dependency graph, and a resource controller to cause transmission of the first request and the second request to the resource-based service based on the dependency graph, and, after determining that the time-based ordering of the first request relative to the second request satisfies the dependency graph, cause transmission of the status indicator to a user device.

9 Claims, 20 Drawing Sheets

(56) References Cited

OTHER PUBLICATIONS

Kubernetes, "Concepts," [https://kubernetes.io/docs], dated Feb. 20, 2020, 5 pages.
Kubernetes, "Eviction Policy," [https://kubernetes.io/docs], last modified Sep. 29, 2020, 2 pages.
Kubernetes, "Extending Kubernetes," [https://kubernetes.io/docs], last modified Nov. 20, 2018, 10 pages.
Kubernetes, "Kubernetes Components," [https://kubernetes.io/docs], last modified Mar. 18, 2020, 7 pages.
Kubernetes, "Kubernetes Scheduler," [https://kubernetes.io/docs], last modified Apr. 7, 2020, 4 pages.
Kubernetes, "Limit Ranges," [https://kubernetes.io/docs], last modified Apr. 10, 2020, 4 pages.
Kubernetes, "Managing Resources for Containers," [https://kubernetes.io/docs], last modified Apr. 27, 2020, 18 pages.
Kubernetes, "Network Policies," [https://kubernetes.io/docs], last modified May 30, 2020, 10 pages.
Kubernetes, "Pod Overhead," [https://kubernetes.io/docs], last modified Oct. 15, 2020, 4 pages.
Kubernetes, "Pod Security Policies," [https://kubernetes.io/docs], last modified Mar. 15, 2020, 20 pages.
Kubernetes, "Process ID Limits and Reservations," [https://kubernetes.io/docs], last modified Dec. 8, 2020, 2 pages.
Kubernetes, "Resource Bin Packing for Extending Resources," [https://kubernetes.io/docs], last modified Aug. 29, 2020, 4 pages.
Kubernetes, "Resource Quotas," [https://kubernetes.io/docs], last modified May 30, 2020, 18 pages.
Kubernetes, "Scheduling Framework," [https://kubernetes.io/docs], last modified May 30, 2020, 7 pages.
Kubernetes, "Service," [https://kubernetes.io/docs], last modified Jan. 15, 2020, 31 pages.
Kubernetes, "Service Topology," [https://kubernetes.io/docs], last modified May 30, 2020, 3 pages.
Kubernetes, "The Kubernetes API," [https://kubernetes.io/docs], last modified May 24, 2020, 7 pages.
Kubernetes, "Understanding Kubernetes Objects," [https://kubernetes.io/docs], last modified Feb. 16, 2020, 5 pages.
Kubernetes, "What is Kubernetes?" [https://kubernetes.io/docs], last modified May 30, 2020, 7 pages.
Kubernetes, "Working with Kubernetes Objects," [https://kubernetes.io/docs], last modified Jun. 22, 2020, 1 page.
United States Patent and Trademark Office, "Non-Final Rejection," in connection with U.S. Appl. No. 16/932,521, dated Feb. 14, 2022, 8 pages.
United States Patent and Trademark Office, "Notice of Allowance and Fee(s) Due," in connection with U. S. U.S. Appl. No. 16/932,521, dated May 27, 2022, 5 pages.

400

```
Yaml
---
apiVersion: v1
kind: ServiceAccount
metadata:
        name: myspace-user
        namespace: mynamespace

---
kind: Role
apiVersion: rbac.authorization.k8s.io/v1beta1
metadata:
        name: mynamespace-user-full-access
        namespace: mynamespace
rules:
- apiGroups: ["", "extensions", "apps:]
  resources: ["*"]
  verbs: ["*"]
- apiGroups: ["batch"]
  resources
  -  jobs
  -  cronjobs
  verbs: ["*"]

---
kind: RoleBinding
apiVersion: rbac.authorization.k8s.io/v1beta1
metadata:
        name: mynamespace-user-view
        namespace: mynamespace
subjects:
- kind: ServiceAccount
  name: mynamespace-user
  namespace: mynamespace
roleRef:
  apiGroup: rbac.authorization.k8s.io
  kind: Role
  name: mynamespace-user-full-access

---
kind: Namespace
metadata:
  name: mynamespace
```

402 (ServiceAccount block), 404 (Role block), 406 (RoleBinding block), 408 (Namespace block), 410 (roleRef block)

```yaml
Yaml
---
apiVersion: v1
kind: Service
metadata:
   name: wordpress-mysql
   labels:
      app: wordpress-svc
spec:
   ports:
      - port: 3306
   selector:
      app: wordpress
      tier: mysql
   clusterIP: None
---
apiVersion: v1
kind: PersistentVolumeClaim
metadata:
   name: mysql
   labels:
      app: wordpress
spec:
   accessModes:
      - ReadWriteOnce
   resources:
      requests:
         storage: 20Gi
---
```

FIG. 6A

```
---
apiVersion: apps/v1 # for versions before 1.9.0 use apps/v1beta2
kind: Deployment
metadata:
  name: wordpress
  labels:
    app: wordpress
spec:
  selector:
    matchLabels:
      app: wordpress
      tier: mysql
  strategy:
    type: Recreate
  template:
    metadata:
      labels:
        app: wordpress
        tier: mysql
    spec:
      containers:
        - image: mysql:5.6
          name: mysql
          env:
            - name: MYSQL_ROOT-PASSWORD
              valueFrom:
                secretKeyRef:
                  name: mysql-pass
                  key: password
          ports:
            - containerPort: 3306
              name: mysql
          volumeMounts:
            - name: mysql-persistent-storage
              persistentVolumeClaim:
                claimeName: mysql-pv-claim
---
```

```
apiVersion: v1
kind: secret
metadata:
   name: database-password
type: Opaque
data:
   username: YWRtaW4=
   password: MWYyZDF1MmU2N2Rm
---
apiVersion: v1
kind: secret
metadata:
   name: admin-password
type: Opaque
data:
   username: YWRtdag5adW4=
   password: MWYA4dghMmU2N2Rm
```

608 (lines "kind: secret" through "password: MWYyZDF1MmU2N2Rm")

610 (lines "apiVersion: v1" through "password: MWYA4dghMmU2N2Rm")

FIG. 6C

```
Yaml
---
components:
  db:
    type: DataBase          — 822
    dependsOn: { }
  ad:
    type: ActiveDirectory
    dependsOn: { }
  backend1:
    type: Backend
    dependsOn: { }
  backend2:
    type: Backend
    dependsOn: { }
  backendLb:
    type: LoadBalancer
    dependsOn:
      - backend1
      - backend2
  ui1:
    type: UserInterface
    dependsOn:              — 824
      - backendLb
  ui2:
    type: UserInterface
    dependsOn:              — 826
      - backendLb
  frontendLb:
    type: LoadBalancer
    dependsOn:
      - ui1
      - ui2
  paygate:
    type: PaymentGateway
    dependsOn: { }
  checker:
    type: ServiceStatusChecker
    dependsOn: { }
```

800 (top right)
802 — db block
804 — ad block
806 — backend1 block
808 — backend2 block
810 — backendLb block
812 — ui1 block
814 — ui2 block
816 — frontendLb block
818 — paygate block
820 — checker block

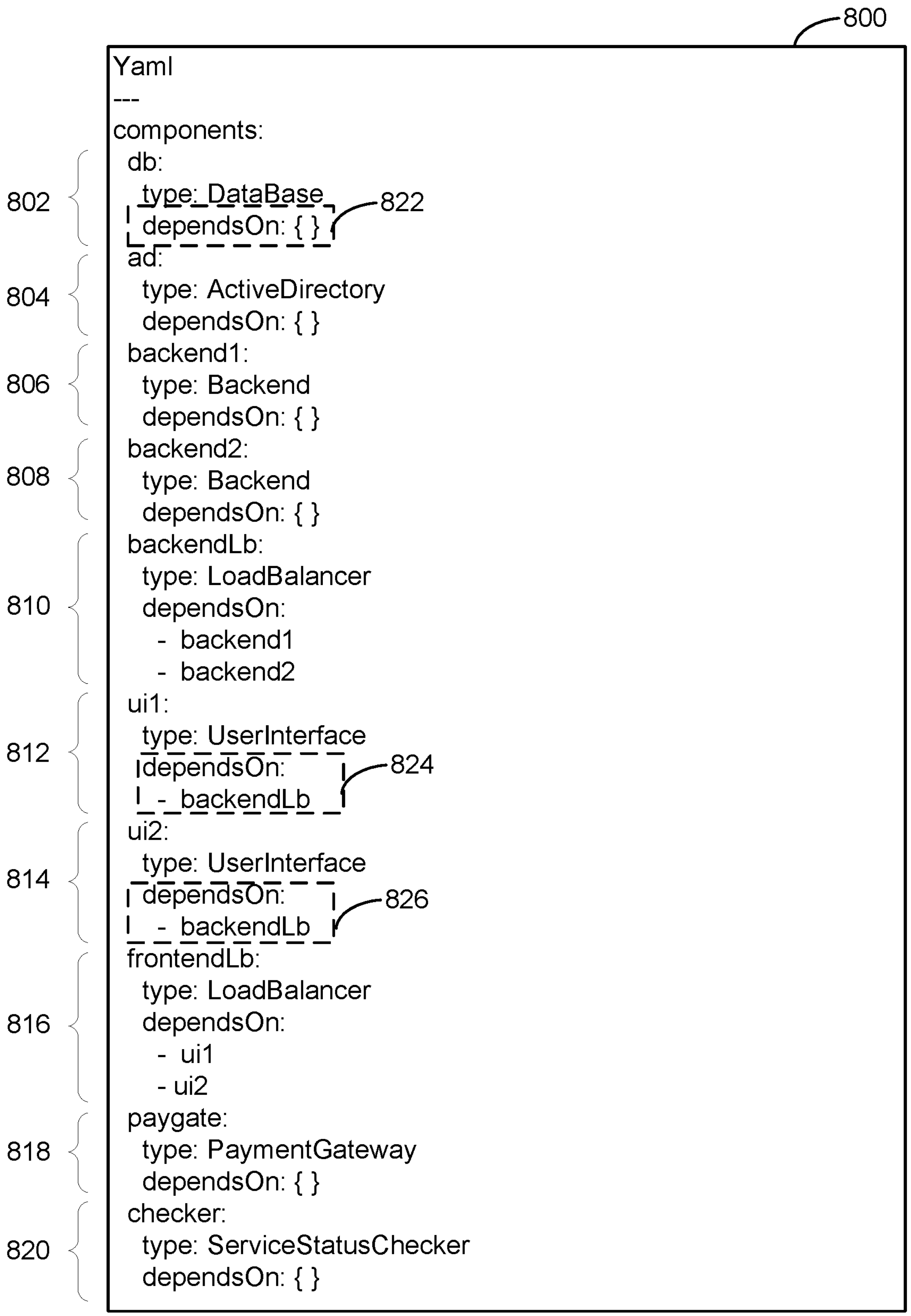

```
Yaml
---
name: voting-deployment
resources:
  voting-app:
    yaml:
      -  ref:voting-app-pod.yml
      -  ref:voting-app-service.yml
    dependsOn:
      - redis
  redis:
    yaml:
      -  ref:redis-pod.yml
      -  ref:redis-service.yml
  worker:
    yaml:
      -  ref:worker-pod.yml
    dependsOn:
      -  redis
      - db
  db:
    yaml:
      -  ref:db-pod.yml
      -  ref:db-service.yml
  result-app:
    yaml:
      -  ref:result-app-pod.yml
      -  ref:result-app-service.yml
    dependsOn:
      -  db
```

1002 (voting-app), 1004 (redis), 1006 (worker), 1008 (db), 1010 (result-app)

FIG. 10

METHODS AND APPARATUS TO HANDLE DEPENDENCIES ASSOCIATED WITH RESOURCE DEPLOYMENT REQUESTS

RELATED APPLICATION

This patent arises from a continuation of U.S. patent application Ser. No. 16/932,521, which was filed on Jul. 17, 2020 (now U.S. Pat. No. 11,442,784). U.S. patent application Ser. No. 16/932,521 is hereby incorporated herein by reference in its entirety. Priority to U.S. patent application Ser. No. 16/932,521 is hereby claimed.

FIELD OF THE DISCLOSURE

This disclosure relates generally to computer systems, and, more particularly, to methods and apparatus to handle dependencies associated with resource deployment requests.

BACKGROUND

A software-defined data center (SDDC) is a data center implemented by software in which hardware is virtualized and provided to users as services. SDDCs allow for dynamically configuring and deploying applications and resources per customer requests and per customer-defined specifications and performance.

BRIEF DESCRIPTION OF THE DRAWINGS

FIG. 4 is an example Yet Another Markup Language (Yaml) file that represents resources of the dependency graph of FIG. 3.

FIGS. 6A-6C is an example Yaml file that represents resources of the dependency graph of FIG. 5.

FIG. 8 is an example Yaml file that represents resources of the dependency graph of FIG. 7.

FIG. 10 is an example Yaml file that represents resources of the dependency graph of FIG. 9B.

The figures are not to scale. Instead, the thickness of the layers or regions may be enlarged in the drawings. In general, the same reference numbers will be used throughout the drawing(s) and accompanying written description to refer to the same or like parts.

Figure 1:
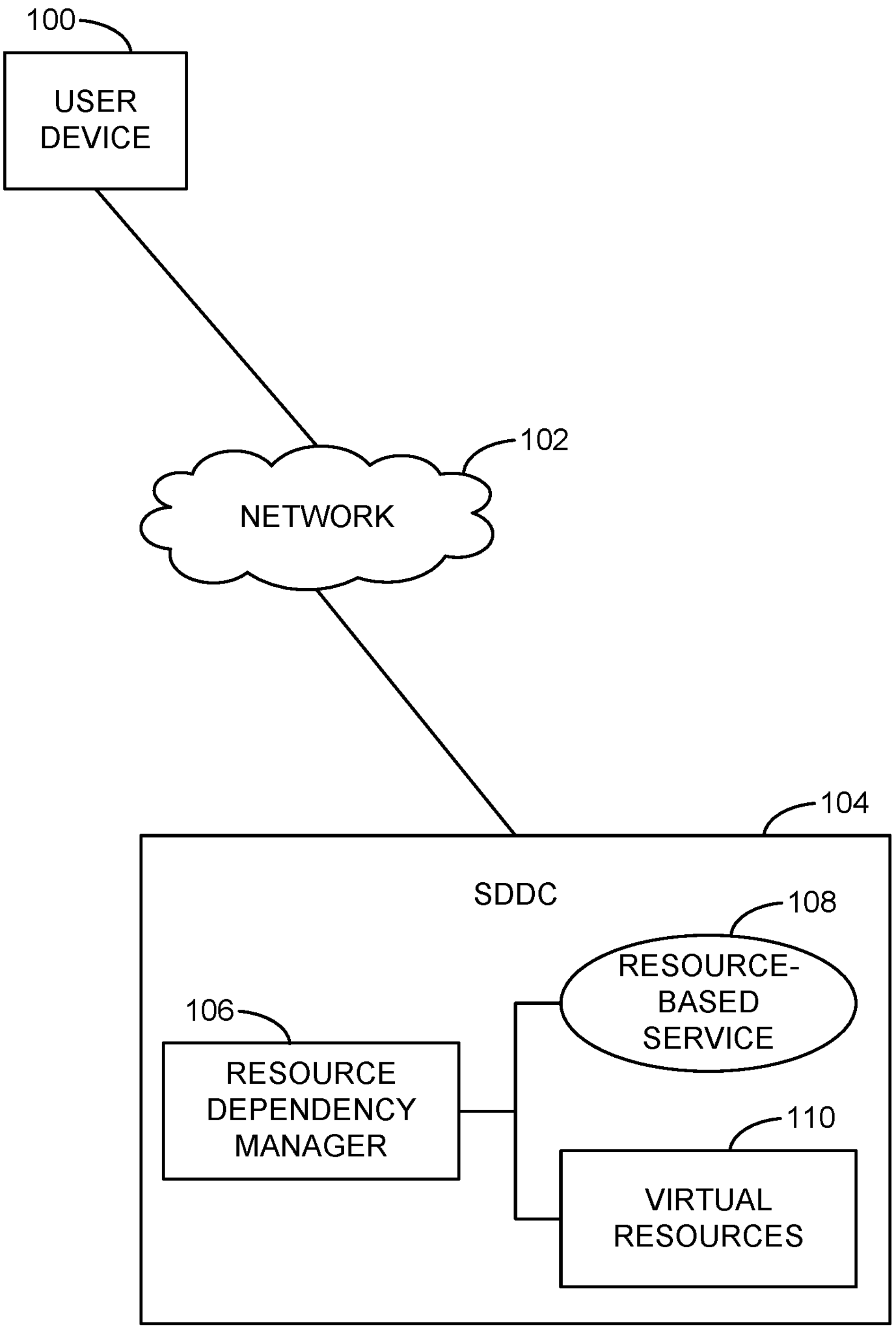
FIG. 1 is a schematic illustration of an example SDDC environment.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

An SDDC environment typically requires deployment of compute resources, network resources, storage resources, and security protocols. Deployment errors may occur and the system state may be inconsistent if these configurations are not done properly. In recent years, complex resource-based services are increasingly popular. As used herein, a resource-based service is a service in which resources are created and/or managed declaratively rather than procedurally. For example, the resource-based service can be KUBERNETES®, which allows users to define and/or use one or more different types of resources and define their own resource types. In some examples, a resource is created and/or managed declaratively via Yaml definitions and a representational state transfer (REST) application programming interface (API). In examples disclosed herein, an SDDC receives one or more resource requests and deploys the resource requests via a resource-based service. The resources can be virtual compute resources, virtual storage resources, and virtual network resources. In prior techniques, the problem comes when a user wants to build or define something complex based on multiple resources and/or resource types.

Resource deployments can be structured to comply with one or more resource dependencies. As used herein, a resource dependency is a relationship between two or more resources, wherein a first resource must be deployed and fulfilled before the second resource is deployed. In prior techniques, resource dependencies of a resource deployment are not determined before deployment. This creates a potential for an error in creating structures in an RBS. That is, the resources may be deployed in an order regardless of potential dependencies between resources. As such, even if a first resource is dependent on a second resource, the first and second resources may be deployed in parallel (e.g., concurrently) and result in a failed deployment, generating an error message. Some prior techniques include a user manually checking the error message and making updates to the resource deployments. However, checking and updating a resource deployment relies on a user's knowledge of all dependencies, deployment timings, etc. between all resources to be used. Although this may be manageable by a user for a small number of resources, it is unlikely for a user to know all possible resource dependencies when the number of resources grows and/or new resource types are introduced. In some prior techniques, the RBS handles knowledge of resource dependencies. However, if the RBS is not well designed, the resource types cannot be easily extended because those extensions could break dependencies between existing resource types and/or introduce new dependencies with new resource types.

Unlike prior techniques of managing resource dependencies, examples disclosed herein provide a resource dependency manager to handle the dependency management responsibility. As such, the dependency management responsibility can be shifted away from users and resource-based services. Examples disclosed herein compare one or more resources of a resource deployment to a dependency graph to determine if the resource deployment is feasible with resource dependencies. This comparison is used to determine a resource deployment order, which represents a time-based ordering and/or timing schedule of deploying the one or more resources of a resource request from a user. After the initial resource deployment order is determined, the order is verified in real-time to further determine whether the order satisfies the resource dependencies. If the deployment order does not satisfy a resource dependency, a resource deployment can be delayed, a time interval between resource deployments can be increased, and/or the dependency graph can be updated. When the resource deployment satisfies the corresponding resource dependencies, an indicator that the resource requests have been fulfilled can be generated.

FIG. 1 is a schematic illustration of an example SDDC environment. The example SDDC environment of FIG. 1 includes an example user device 100, an example network 102, and an example SDDC 104. The example SDDC 104 includes an example resource dependency manager 106, an example resource-based service 108, and example virtual resources 110. The example user device 100 and the example SDDC 104 communicate via the example network 102.

The user device 100 of the illustrated example of FIG. 1 receives resource requests from a user. For example, the user device 100 receives one or more resource requests from a user to build a structure (e.g., a high-level service, a component, etc.). The user device 100 sends the one or more resource requests to the SDDC 104 via the network 102. For example, the user device 100 may be a workstation, computer, a server host running one or more virtual machines and/or containers, a computing tablet, a smartphone, etc.

The SDDC 104 of the illustrated example of FIG. 1 virtualizes the network resources and storage resources allocated for resource-based services and/or applications. In examples disclosed herein, the SDDC 104 provides the resources to be managed by the resource dependency manager 106 for use in the resource-based service 108.

The resource dependency manager 106 of the illustrated example of FIG. 1 determines an ordering of resource deployments by comparing resource requests from the user device 100 to a resource dependency database. The example resource dependency manager 106 determines whether there are resource dependencies between one or more resources in the resource request based on a resource dependency database. The example resource dependency manager 106 generates a dependency graph based on the one or more dependencies between one or more resources of the resource request. That is, the example resource dependency manager 106 determines a deployment order of the resources of the resource requests based on resource dependencies. The example resource dependency manager 106 verifies the order of the resource deployments. For example, the resource dependency manager 106 tracks whether the resource-based service 108 generates an error message. In response to an error message, the example resource dependency manager 106 may redeploy the resource request, introduce a time delay between resource deployments, and/or update the resource dependency database and/or dependency graph.

In examples disclosed herein, the resource dependency manager 106 is a standalone component or service. In such examples, the resource dependency manager 106 can be modified independently of the user (e.g., a technician, administrator, etc.) and the resource-based service 108. For example, a new dependency rule can be added to a dependency database in the resource dependency manager 106. However, examples disclosed herein are not limited thereto. For example, the resource dependency manager 106 can be a user-side component (e.g., in a client library, in a command line interface (CLI), in a proxy, etc.). In other examples, the resource dependency manager 106 can be part of the resource-based service 108. However, as described above, in such examples the resource types may not be easily extended. The example resource dependency manager 106 is described below in connection with FIG. 2.

The resource-based service 108 of the illustrated example of FIG. 1 receives and fulfills the resource requests of the user device 100 from the resource dependency manager 106. In examples disclosed herein, the resource-based service 108 enables users to define and/or use a plurality of different types of resources, define new resources, etc. For example, the resource-based service 108 may be KUBERNETES®. The example resource-based service 108 generates an error message in response to a resource deployment that is out of order. For example, if a dependent resource is deployed in parallel with and/or before the resource it is dependent on, the resource-based service 108 generates an error.

The virtual resources 110 of the illustrated example of FIG. 1 are logical representations of underlying physical resources and are provided to perform the functions of those physical resources for the user device 100. For example, a physical network interface card (pNIC) may be virtualized to provide one or more virtual network interface cards (vNIC). In this manner, a single physical resource can be used in multiple deployments through its virtualized representations. In examples disclosed herein, the virtual resources 110 include virtualized compute resource(s), virtualized storage resource(s), and/or virtualized networking resource(s). However, any other virtual resources may additionally or alternatively be used.

Figure 2:
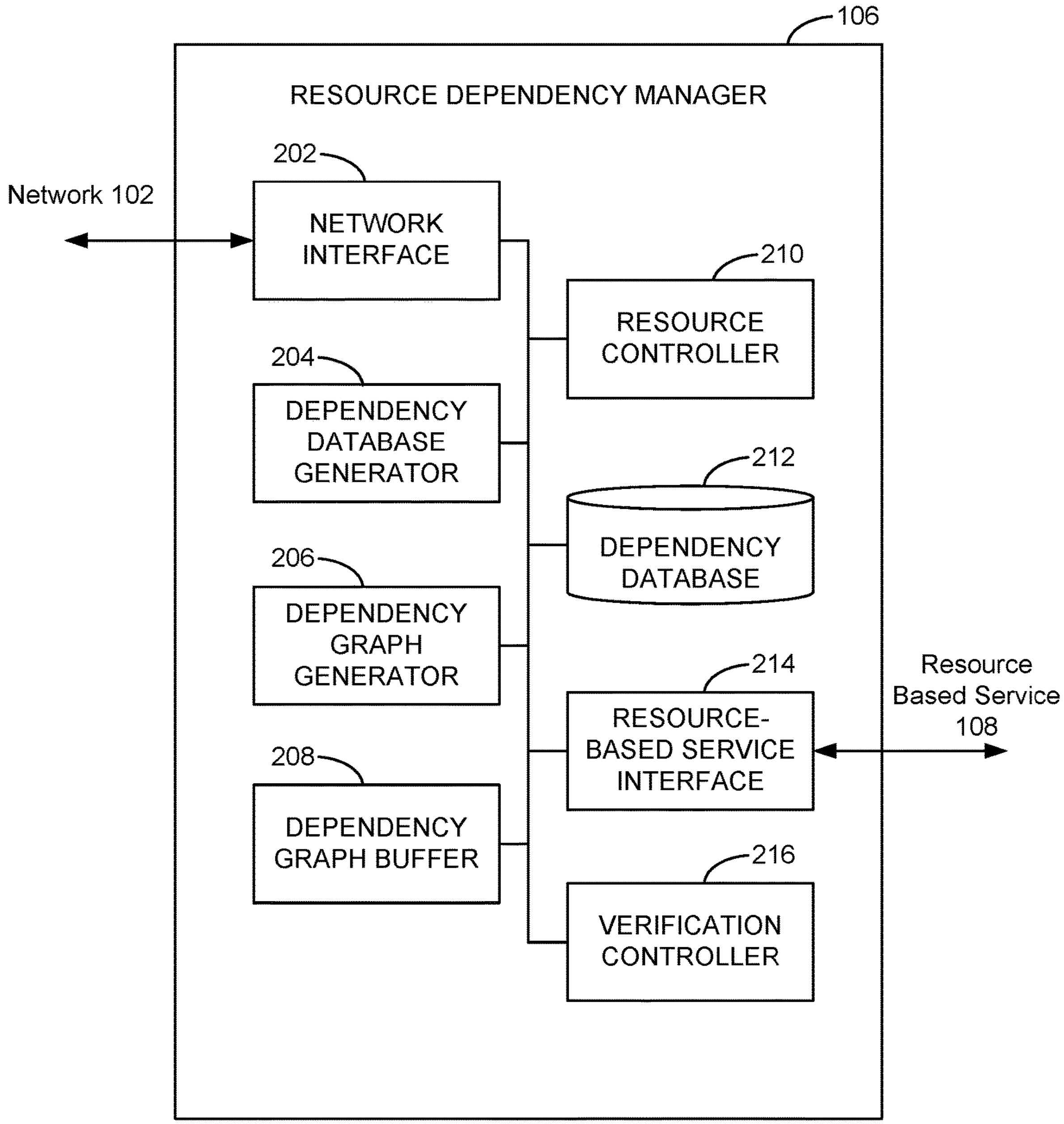
FIG. 2 is a block diagram representative of an example resource dependency manager of the example SDDC environment of FIG. 1

FIG. 2 is a block diagram representative of the example resource dependency manager 106 of the example SDDC environment of FIG. 1. The resource dependency manager 106 of FIG. 2 includes an example network interface 202, an example dependency database generator 204, an example dependency graph generator 206, an example dependency graph buffer 208, an example resource controller 210, an example dependency database 212, an example resource-based service interface 214, and an example verification controller 216.

The network interface 202 of the illustrated example of FIG. 2 is provided to allow the resource dependency manager 106 to receive resource requests from the example network 102. In some examples, the network interface 202 can be continuously connected to the network 102 and/or the user device 100 for communication with the network 102 and/or the user device 100. In other examples, the network interface 202 can be periodically or aperiodically connected for periodic or aperiodic communication with the network 102 and/or the user device 100. In some examples, the network interface 202 can be absent.

The dependency database generator 204 of the illustrated example of FIG. 2 identifies and stores resource dependencies in the dependency database 212. In some examples, the dependency database 212 models dependencies specified by the resource-based service 108. In examples disclosed herein, the dependency database generator 204 determines whether a resource specified in a resource request is stored in the dependency database 212. In some instances, a resource of a resource request may not be stored in the dependency database 212. For example, the resource may be a new resource (e.g., a recently released resource, etc.). In response to determining the resource is not stored in the dependency database 212, the dependency database generator 204 adds the resource to the dependency database 212. In response to determining the resource is stored in the dependency database 212, the dependency database generator 204 determines whether the resource has dependencies. If the resource does have dependencies, the dependency database generator 204 stores the dependency in the dependency database 212. For example, the resource may be dependent on one or more other resources, one or more other resources may be dependent on the resource, etc.

In examples disclosed herein, the dependency database generator 204 stores a time delay indication in association with the dependent resource of a resource dependency. For example, the time delay indication determines the time delay between the resource deployments of the independent and dependent resources. That is, the resource controller 210 deploys the resource request of the dependent resource at a relatively later time than the resource request of the corresponding independent resource based on the time delay indication. In some examples, the dependency database generator 204 determines the time delay indication based on the amount of time it takes the independent resource to initialize. For example, the time delay indication can be 1 millisecond, 5 milliseconds, etc. Additionally or alternatively, the dependency database generator 204 determines the time delay indication based on confirmation that the resource request of the independent resource is successfully deployed. For example, if the resource controller 210 receives an indication from the resource-based service 108 (FIG. 1) that the resource request of the independent resource was successfully deployed before the time delay indication has lapsed, the resource controller 210 can deploy the resource request of the dependent resource regardless of the time delay indication.

In some examples, the dependency database generator 204 is a user interface responsive to user input to store the resource dependency in the dependency database 212. For example, the user input may be provided by an administrator, technician, or other user in response to an indication that the resource dependency is not previously stored. In some examples, the dependency database generator 204 uses machine learning to store a resource in the dependency database 212. Additionally or alternatively, the dependency database generator 204 may update a resource dependency indication in the dependency database 212 in response to a number of error indications (e.g., resource request failures) exceeding an error threshold. For example, if the number of error indications exceeds the error threshold, it may be because the dependency graph generator 206 generated an incorrect dependency graph due to a dependency error. For example, the error threshold can be three. In such an example, the dependency database generator 204 may determine, in response to the number of error indications exceeding three (e.g., more than three failed attempts of requesting a resource), that there is an unaccounted resource dependency. In other examples, the error threshold may be any other suitable number selected based on, for example, desired performance and/or any other desired criteria.

The dependency graph generator 206 of the illustrated example of FIG. 2 generates a dependency graph of the resources included in the resource request. The dependency graph generator 206 is provided to determine an ordering of resource deployments to the resource-based service 108 of the SDDC environment of FIG. 1. For example, the dependency graph generator 206 accesses the dependency database 212 to determine whether the resources in the resource request have resource dependencies. The dependency graph generator 206 generates a dependency graph based on the resource dependencies. In examples disclosed herein, the resource dependency manager 106 determines the ordering of resource deployments to the resource-based service 108 based on the dependency graph. For example, the dependency graph may indicate two resources are not dependent on each other. Thus, the example resource dependency manager 106 deploys the two resources in parallel to optimize computing time. In some examples, the dependency graph may indicate a first resource is dependent on a second resource. Thus, the example resource dependency manager 106 deploys first resource to the resource-based service 108 at a later time than the deployment of the second resource. Example dependency graphs are described below in connection with FIGS. 3, 5, 7, and 9. The example dependency graph generator 206 stores the dependency graph of the resource request in the dependency graph buffer 208.

The example dependency graph buffer 208 of the illustrated example of FIG. 2 stores dependency graphs generated by the dependency graph generator 206. In examples disclosed herein, when the resource dependency manager 106 is to deploy resource requests (e.g., based on resource requests from the user device 100), the dependency graphs stored in the dependency graph buffer 208 can be used by the resource controller 210 to determine an ordering of resource deployments to the resource-based service 108. The example dependency graph buffer 208 may be implemented by any suitable type of memory, storage device, and/or storage disk to store a data file that stores the dependency graphs to be used by the resource dependency manager 106 under analysis for resource deployment in a resource-based service 108. The example dependency graph buffer 208 can be implemented as any data file such as, for example, a JSON file, a text file, or any other data file type.

The example resource controller 210 of the illustrated example of FIG. 2 sends the resource deployments of the resource request to the resource-based service 108 based on the dependency graph stored in the dependency graph buffer 208. For example, the resource controller 210 accesses the dependency graph buffer 208. The example resource controller 210 deploys one or more resource requests of the resource request to the resource-based service 108 via the resource-based service interface 214. In examples disclosed herein, the resource controller 210 deploys independent resources of the resource request to the resource-based service 108 in parallel (e.g., simultaneously). In some examples, in response to the second resource being dependent on the first resource, the resource controller 210 determines a time delay that is to elapse between deployments of first and second resources. The resource controller 210 determines the time delay based on the time delay indication associated with the resource dependency in the dependency database 212. Thus, the example resource controller 210 deploys the second resource to the resource-based service 108 at a later time (e.g., based on the time delay) than the deployment of the first resource of the resource request. In examples disclosed herein, the resource controller 210 may determine to retry a resource deployment in response to an error message (e.g., the resource request failed).

The dependency database 212 of the illustrated example of FIG. 2 stores resource dependencies. However, other data may additionally and/or alternatively be stored by the dependency database 212. The dependency database 212 of the illustrated example of FIG. 2 is implemented by any memory, storage device, and/or storage disc for storing data such as, for example, flash memory, magnetic media, optical media, solid state memory, hard drive(s), thumb drive(s), etc. Furthermore, the data stored in the example dependency database 212 may be in any format such as, for example, binary data, comma delimited data, tab delimitated data, structured query language (SQL) structures, etc. While, in the illustrated example of FIG. 1, the dependency database 212 is illustrated as a single device, the dependency database 212 and/or any other data storage devices described herein may be implemented by any number and/or type(s) of storage devices.

The resource-based service interface 214 of the illustrated example of FIG. 2 is provided to allow the resource dependency manager 106 to communicate resource deployments to the resource-based service 108. For example, the resource dependency manager 106 can send a resource deployment to the resource-based service 108 via the resource-based service interface 214. The example resource dependency manager 106 can receive an indication from the resource-based service 108 (e.g., the resource status, an error message, etc.) via the resource-based service interface 214. For example, the resource-based service interface 214 can collect the resource statuses of the resource request deployments from the resource-based service 108 and display and/or otherwise alert the user that the resource requests were fulfilled. In some examples, the resource-based service interface 214 can be in continuously connected to the resource-based service 108 for communication with the resource-based service 108. In other examples, the resource-based service interface 214 can be periodically or aperiodically connected for periodic or aperiodic communication with the resource-based service 108. In some examples, the resource-based service interface 214 is absent. For example, the resource controller 210 may interact with the resource-based service 108 directly (e.g., send a resource deployment without the resource-based service interface 214).

The verification controller 216 of the illustrated example of FIG. 2 verifies the resource deployments. That is, the example verification controller 216 verifies the order of the resource deployments (e.g., the dependencies defined in the dependency graph generated by the dependency graph generator 206) and/or the timing of the resource deployments. For example, the dependency graph stored in the dependency graph buffer 208 may define an incorrect resource dependency and, thus, result in an error message when the resource controller 210 deploys the resource(s) in that specified order. Additionally or alternatively, the resource controller 210 may use an incorrect time delay. For example, the resource controller 210 may send a resource deployment of a dependent resource too early (e.g., the resource request of the corresponding independent resource is not yet fulfilled). In some examples, in response to the verification controller 216 determining the order of the resource deployments was correct, the resource controller 210 generates and displays a status indicator to the user device 100 (FIG. 1).

In examples disclosed herein, the network interface 202 may implement means for receiving resource requests. The example dependency database generator 204 may implement means for generating a dependency database. The example dependency graph generator 206 may implement means for generating a dependency graph. The example dependency buffer 208 may implement means for storing dependency graphs. The example resource controller 210 may implement means for controlling resource deployment requests. The example dependency database 212 may implement means for modeling dependencies. The example resource-based service interface 214 may implement means for communicating resource deployments. The example verification controller 216 may implement means for verifying a time-based ordering.

Figure 3:
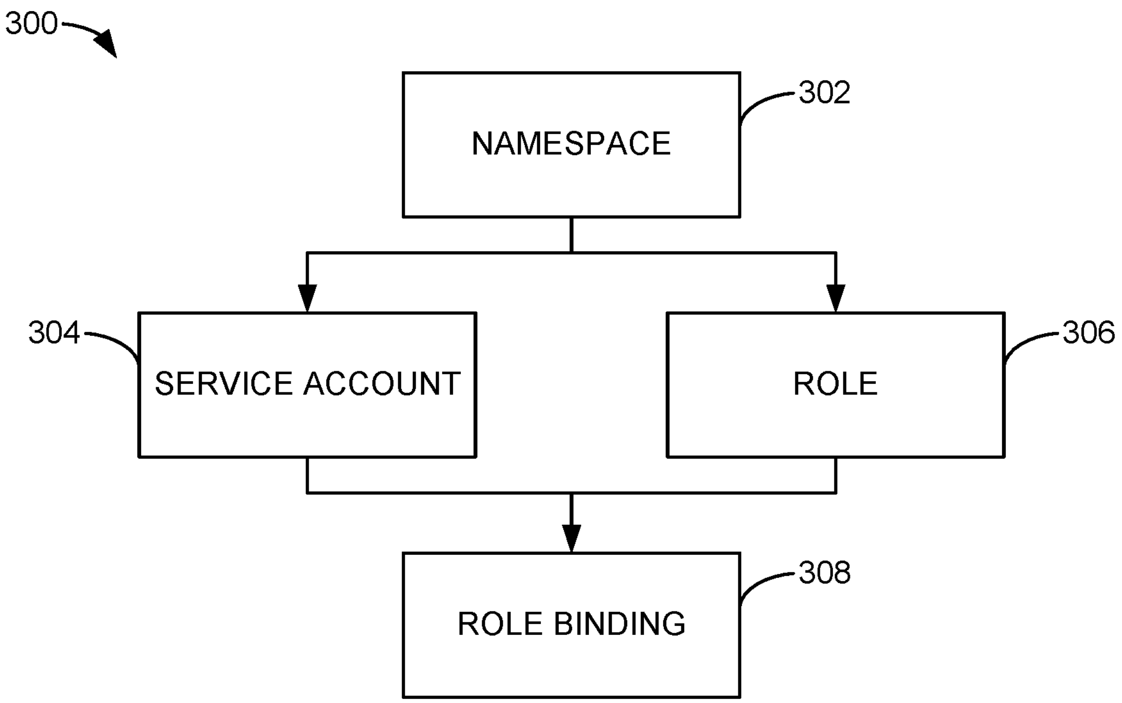
FIG. 3 depicts an example dependency graph.

FIG. 3 depicts an example dependency graph 300. The dependency graph 300 includes an example namespace resource 302, an example service account resource 304, an example role resource 306, and an example role binding resource 308. In the illustrated example of FIG. 3, the resources 302, 304, 306, 308 are KUBERNETES® resources. The example namespace resource 302 is an independent resource. That is, the example namespace resource 302 is not dependent on any other resources. The example namespace resource 302 can be used to divide compute resources between multiple users in a KUBERNETES® cluster. The example service account resource 304 and the example role resource 306 are both independent and dependent resources. That is, the example service account resource 304 and the example role resource 306 can be created in parallel in the namespace but the example service account resource 304 and the example role resource 306 depend on the example namespace resource 302. The example role binding resource 308 depends on the example service account resource 304 and the example role resource 306. The example service account resource 304 manages one or more user accounts. The example role resource 306 is a set of permissions. The example role binding resource 308 is a dependent resource. That is, the example role binding resource 308 depends on at least one other resource (e.g., the service account resource 304 and the role resource 306). The example role binding resource 308 associates the service account resource 304 with the role resource 306. In this manner, the service account resource 304 gains the privileges of the role resource 306 within the namespace.

When a resource request specifies the namespace resource 302, the example resource controller 210 of FIG. 2 deploys the namespace resource 302 of the resource request to the resource-based service 108. In the illustrated example, there is no dependency between the service account resource 304 and the role resource 306. Thus, the example resource controller 210 can deploy the service account resource 304 and the role resource 306 to the resource-based service 108 in parallel. The example resource controller 210 deploys the role binding resource 308 after the namespace resource 302, the service account resource 304, and the role resource 306 are deployed.

FIG. 4 is an example Yet Another Markup Language (Yaml) file 400 that represents resources of the dependency graph 300 of FIG. 3. The example Yaml file 400 is represented as programming language pseudocode of machine-readable instructions that may be executed to determine resource deployment order of the resources in the dependency graph 300 of FIG. 3. That is, the example Yaml file 400 is a resource request file. In some examples, the Yaml file 400 is stored in the dependency graph buffer 208. The example Yaml file 400 includes example service account resource lines of code 402, example role resource lines of code 404, example role binding resource lines of code 406, and example namespace resource lines of code 408. In the illustrated example, the service account resource lines of code 402 correspond to the service account resource 304 of FIG. 3, the role resource lines of code 404 correspond to the role resource 306 of FIG. 3, the role binding resource lines of code 406 correspond to the role binding resource 308 of FIG. 3, and the namespace resource lines of code 408 correspond to the namespace resource 302 of FIG. 3.

The example Yaml file 400 corresponds to KUBERNETES® resources (e.g., the resources 302, 304, 306, 308 (FIG. 3)). In such an example, the dependency database 212 (FIG. 2) may include the dependencies of the KUBERNETES® resources. For example, the role binding resource lines of code 406 corresponding to the role binding resource 308 includes example role binding resource lines of code 410. The example role binding resource lines of code 410 includes "roleRef," which refers to the resource dependency (e.g., the example role resource 306, "name: mynamespace-user-full-access"). In examples disclosed herein, the resource dependency either already exists in KUBERNETES® or is created to satisfy the resource dependency.

Figure 5:
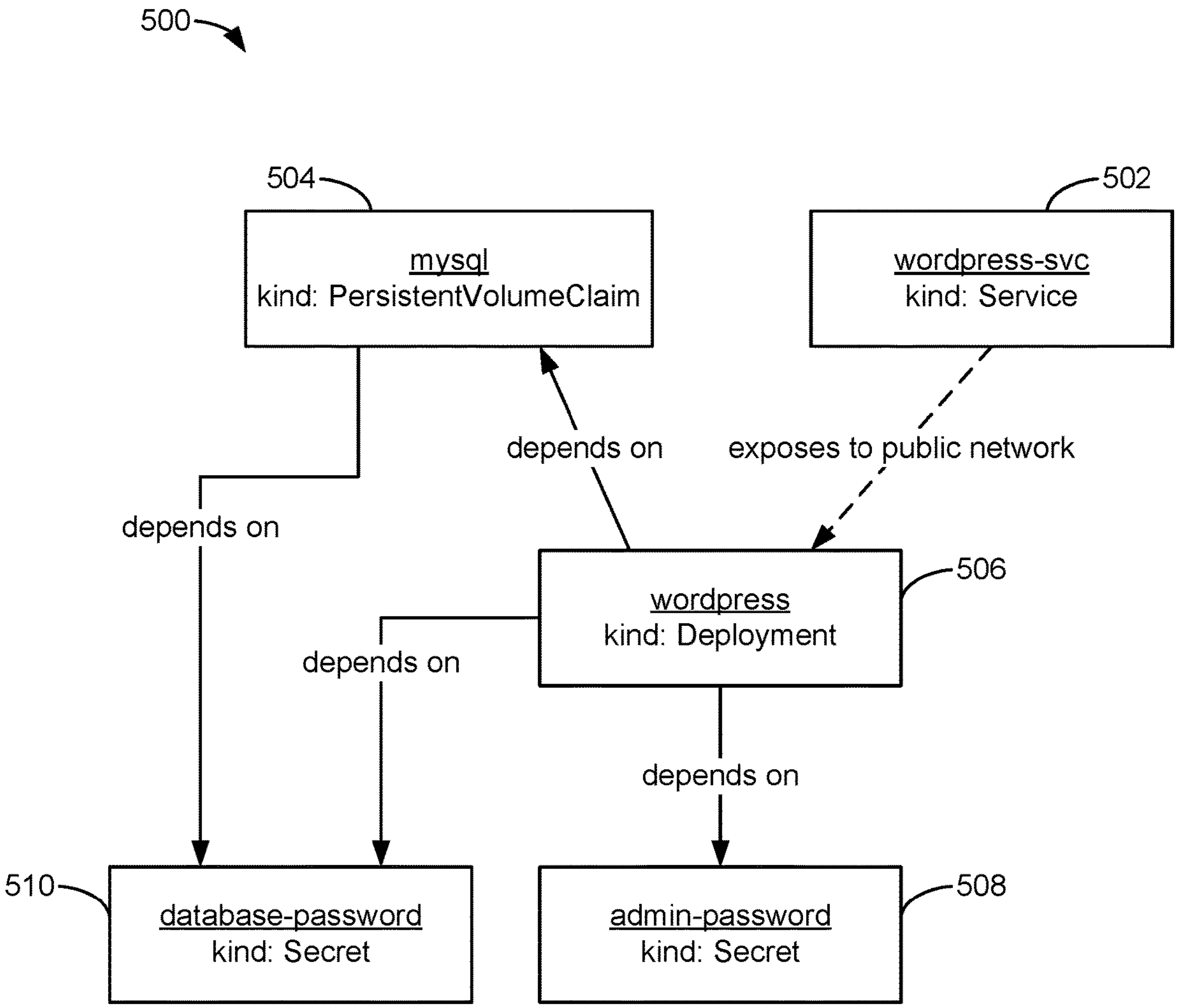
FIG. 5 depicts an example dependency graph of an example WordPress and database application.

FIG. 5 depicts an example dependency graph 500 of an example WordPress and database application. The dependency graph 500 includes KUBERNETES® resources for a WordPress and database application. In the illustrated example of FIG. 5, the dependency graph 500 includes an example Service resource 502, an example PersistentVolumeClaim resource 504, an example Deployment resource 506, an example Secret resource 508, and an example Secret resource 510. The example Service resource 502 exposes an application running as a network service (e.g., wordpress-svc). The example PersistentVolumeClaim resource 504 is a request for storage by a user (e.g., mysql). The example Deployment resource 506 provides declarative updates (e.g., desired state) for where an application runs inside KUBERNETES® (e.g., wordpress). The example Secret resource 508 stores and manages sensitive information (e.g., passwords, OAuth tokens, and SSH keys) (e.g., admin-password). The example Secret resource 510 stores and manages sensitive information (e.g., database-password).

The example Service resource 502 is an independent resource. In the example of FIG. 5, the example PersistentVolumeClaim resource 504, the example Deployment resource 506, the example Secret resource 508, and the example Secret resource 510 are dependent resources. For example, the Deployment resource 506 depends on the Service resource 502. In the illustrated example of FIG. 5, the arrow between the Deployment resource 506 and the Service resource 502 is a dashed arrow with the caption "exposes to public network." In examples disclosed herein, the dashed arrow indicates the Service resource 502 exposes the Deployment resource 506 as a network endpoint. Additionally or alternatively, the arrow between the Deployment resource 506 and the Service resource 502 is a solid arrow with the caption "depends on." Also in the illustrated example, the example PersistentVolumeClaim resource 504, the example Secret resource 508, and the example Secret resource 510 depend on the example Deployment resource 506. Thus, the example resource controller 210 (FIG. 2) can deploy the example PersistentVolumeClaim resource 504 and the example Secret resource 508 in parallel after deploying the example Deployment resource 506. Based on the example dependency graph 500, the resource controller 210 does not deploy the example Secret resource 510 in parallel with the example PersistentVolumeClaim resource 504 and the example Secret resource 508 because the dependency graph 500 indicates the example Secret resource 510 is also dependent on the example PersistentVolumeClaim resource 504. That is, the example Secret resource 510 depends on both the example PersistentVolumeClaim resource 504 and the example Deployment resource 506.

FIGS. 6A, 6B, and 6C are an example Yaml file 600 that represents resources of the dependency graph 500 of FIG. 5. The example Yaml file 600 is represented as programming language pseudocode of machine-readable instructions that may be executed to determine resource deployment order of the resources in the dependency graph 500 of FIG. 5. That is, the example Yaml file 600 is a resource request file. In some examples, the Yaml file 600 is stored in the dependency graph buffer 208. The example Yaml file 600 includes example Service resource lines of code 602, example PersistentVolumeClaim resource lines of code 604, example Deployment resource lines of code 606, example Secret resource lines of code 608, and example Secret resource lines of code 610. In the illustrated example of FIGS. 6A, 6B, 6C, the example Service resource lines of code 602 correspond to the example Service resource 502, the example PersistentVolumeClaim resource lines of code 604 correspond to the example PersistentVolumeClaim resource 504, the example Deployment resource lines of code 606 correspond to the example Deployment resource 506, the example Secret resource lines of code 608 correspond to the example Secret resource 510, and the example Secret resource lines of code 610 correspond to the example Secret resource 508.

Figure 7:
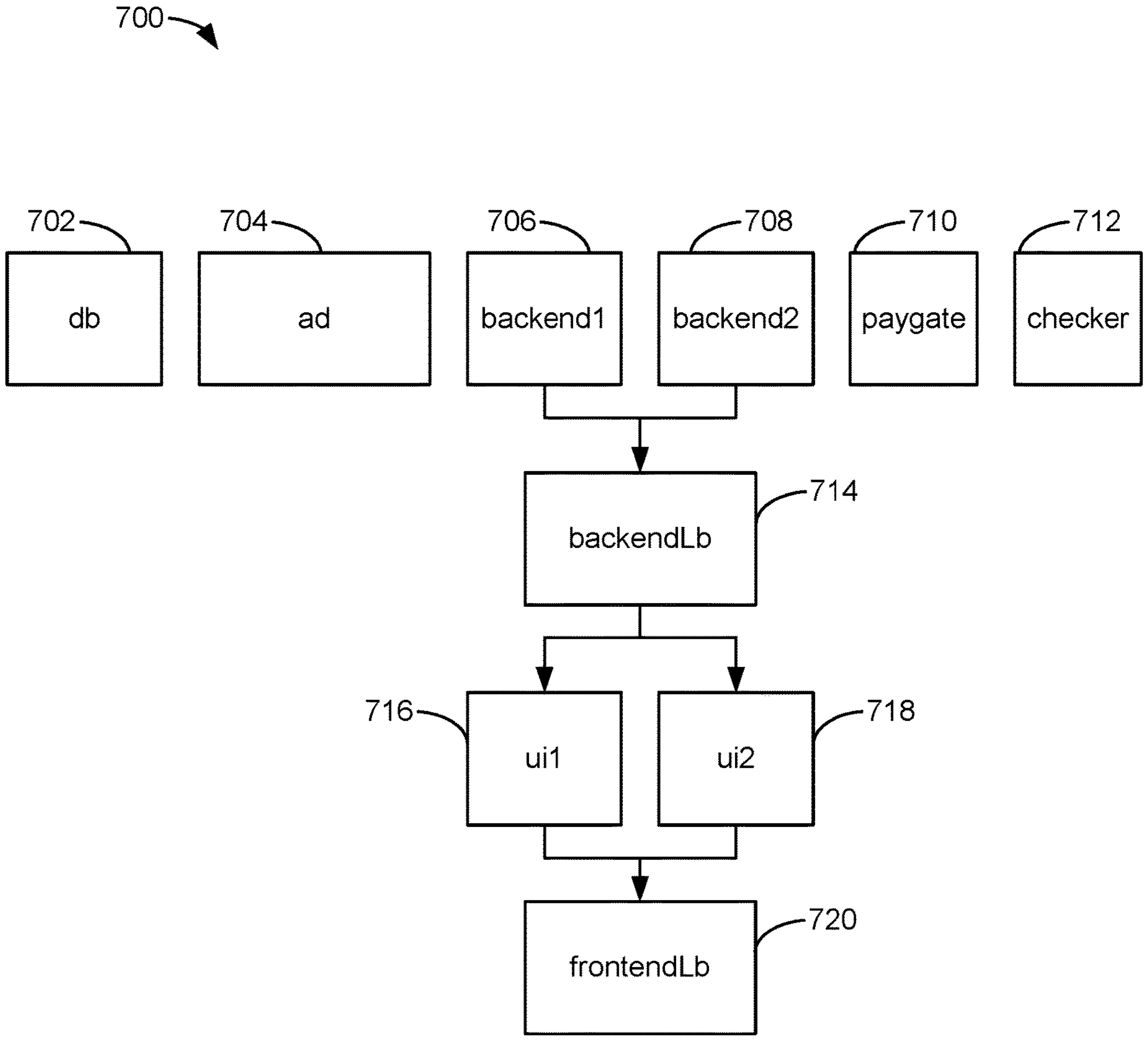
FIG. 7 depicts an example dependency graph of an example banking application.

FIG. 7 depicts an example dependency graph 700 of an example banking application. The dependency graph 700 includes an example db resource 702, an example ad resource 704, an example backend1 resource 706, an example backend2 resource 708, an example paygate resource 710, an example checker resource 712, an example backendLb resource 714, an example ui1 resource 716, an example ui2 resource 718, and an example frontendLb resource 720. The example resources 702, 704, 706, 708, 710, 712, 714, 716, 718, 720 may be deployed in four phases based on their dependencies as described below. In the illustrated example of FIG. 7, the resources 702, 704, 706, 708, 710, 712, 714, 716, 718, 720 are not KUBERNETES® resources. The example db resource 702 is a virtual memory resource (e.g., a database) and the example ad resource 704 is a virtual memory resource (e.g., an active directory). The example backend1 resource 706 and the example backend2 resource 708 are application backend services. The example paygate resource 710 is a payment gateway, and the example checker resource 712 is a payment device. In some examples, the resources 702, 704, 710, 712 are external components, while the resources 706, 708, 714, 716, 718, 720 are application components. The resources 702, 704, 706, 708, 710, 712 are independent resources. Thus, the example resource controller 210 deploys the resource requests of the resources 702, 704, 706, 708, 710, 712 to the resource-based service 108 in parallel during a first phase.

The example backendLb resource 714 is a backend load balancer resource. In the illustrated example, the backendLb resource 714 is dependent on the both the example backend1 resource 706 and the example backend2 resource 708. Thus, the example resource controller 210 may deploy the resource request of the example backendLb resource 714 to the example resource-based service 108 during a second phase after the resource requests of the example backend1 resource 706 and the example backend2 resource 708 have been deployed. The example ui1 resource 716 is a first user interface resource and the example ui2 resource 718 is a second user interface resource. The example resource controller 210 may deploy the resource requests of the example ui1 resource 716 and the example ui2 resource 718 to the example resource-based service 108 in parallel during a third phase. The example frontendLb resource 720 is a frontend load balancer resource. The example resource controller 210 may deploy the resource request of the example frontendLb resource 720 to the example resource-based service 108 at a later time during a fourth phase than the resource requests of the resources 702, 704, 706, 708, 710, 712, 714, 716, 718.

FIG. 8 is an example Yaml file 800 that represents resources of the dependency graph 700 of FIG. 7. The example Yaml file 800 is represented as programming language pseudocode of machine-readable instructions that may be executed to determine resource deployment order of the resources in the dependency graph 700 of FIG. 7. That is, the example Yaml file 800 is a resource request file. In some examples, the Yaml file 800 is stored in the dependency graph buffer 208. The example Yaml file 800 includes the example db resource lines of code 802, example ad resource lines of code 804, example backend1 resource lines of code 806, example backend2 resource lines of code 808, example backendLb resource lines of code 810, example ui1 resource lines of code 812, example ui2 resource lines of code 814, example frontendLb resource lines of code 816, example paygate resource lines of code 818, and example checker resource lines of code 820. In the illustrated example, the db resource lines of code 802 correspond to the db resource 702, the ad resource lines of code 804 correspond to the ad resource 704, the backend1 resource lines of code 806 correspond to the backend1 resource 706, the backend2 resource lines of code 808 correspond to the backend2 resource 708, the backendLb resource lines of code 810 correspond to the backendLb resource 714, the ui1 resource lines of code 812 correspond to the ui1 resource 716, the ui2 resource lines of code 814 correspond to the ui2 resource 718, the frontendLb resource lines of code 816 correspond to the frontendLb resource 720, the paygate resource lines of code 818 correspond to the paygate resource 710, and the checker resource lines of code 820 correspond to the checker resource 712.

In the illustrated example of FIG. 8, an example db resource line of code 822 of the Yaml file 800 includes an independent resource indicator "dependsOn: { }." For example, the resources 702, 704, 706, 708, 710, 712 of FIG. 7 are independent resources and, thus, include the independent resource indicator "dependsOn: { }." In the illustrated example of FIG. 8, example ui1 resource lines of code 824 of the Yaml file 800 indicate the example ui1 resource 716 is dependent on the example backendLb resource 714 (e.g., "dependsOn:—backendLb"). Similarly, example ui2 resource lines of code 826 of the Yaml file 800 indicate the example ui2 resource 718 is also dependent on the example backendLb resource 714 (e.g., "dependsOn:—backendLb"). If the example resource controller 210 (FIG. 2) deploys the resource requests of the resources 702, 704, 706, 708, 710, 712, 714, 716, 718, 720 based on the dependency graph 700, the example verification controller 216 can indicate the resources were successfully requested. That is, the example dependency graph 700 maintains the correct resource dependencies. For example, the example ui2 resource 718 is dependent on the seventh resource 714, which in turn is dependent on the example backend1 resource 706 and the example backend2 resource 708. Thus, the example ui2 resource 718 is indirectly dependent on the example backend1 resource 706 and the example backend2 resource 708, matching the dependencies defined in the ui2 resource lines of code 826 of the example Yaml file 800.

Figure 9A:
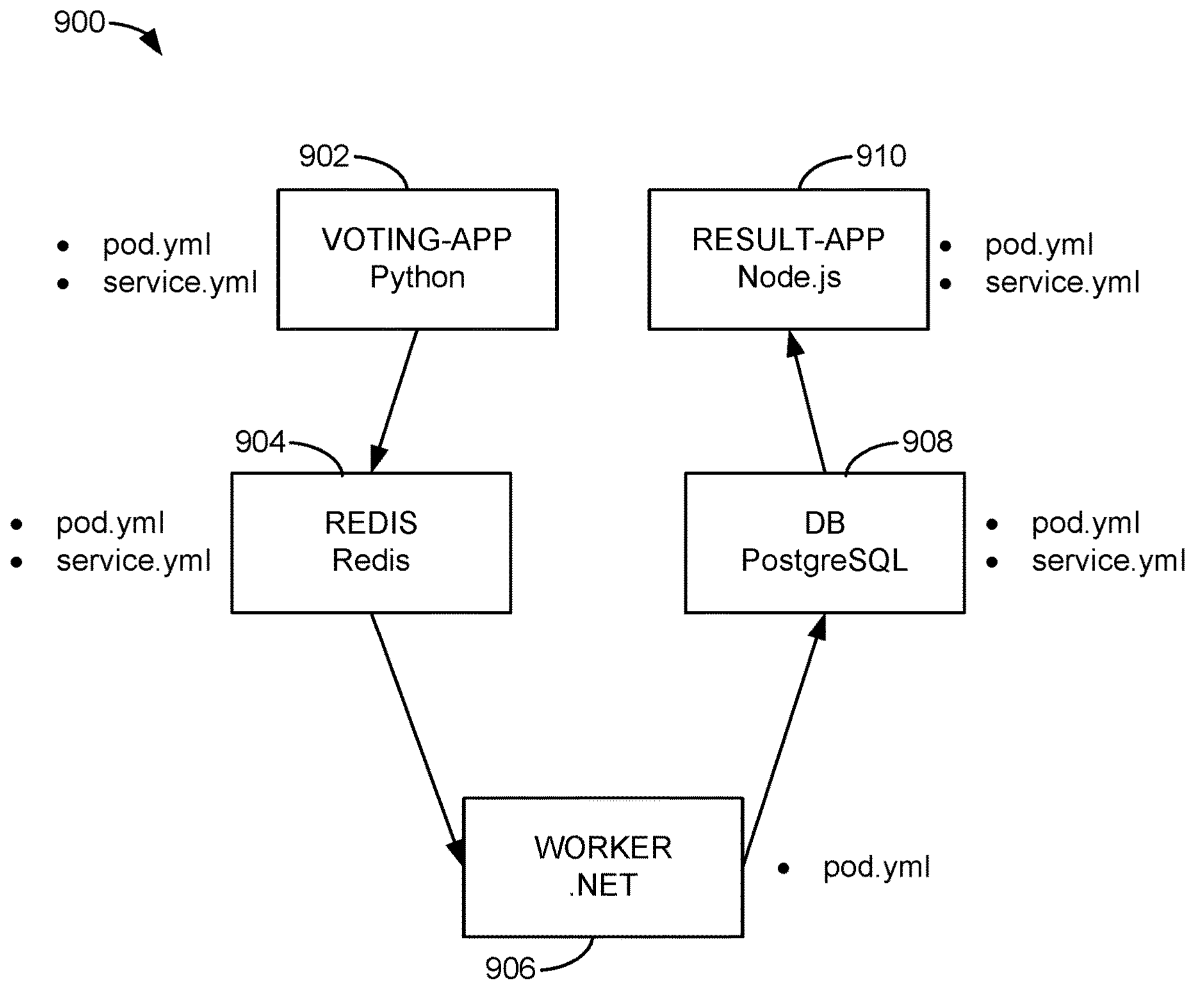
FIG. 9A depicts an example model of an example voting application.
Figure 9B:
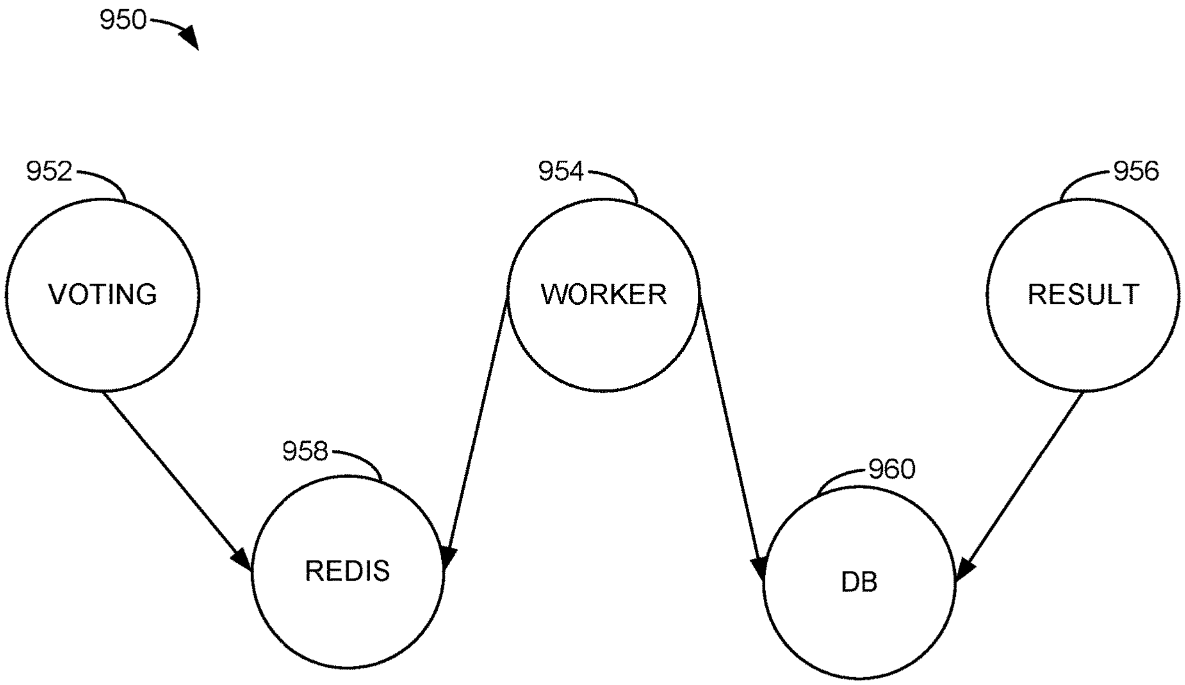
FIG. 9B depicts an example dependency graph of the example voting application of FIG. 9A.

FIG. 9A depicts an example model 900 of an example voting application with a UI service, a backend service, a database (DB), and a key value (KV) store. Example resources for the voting application represented in the model 900 include an example voting-app resource 902, an example redis resource 904, an example worker resource 906, an example db resource 908, and an example result-app resource 910. The example voting-app resource 902 is a front-end web app which allows a user to vote between two options. In some examples, the voting-app resource 902 is implemented in Python® or ASP.NET Core. In the example of FIG. 9B, the example voting-app resource 902 can be implemented using voting-app-pod.yml and voting-app-service.yml files. The example redis resource 904 is a Redis or NATS™ queue to collect new votes. In the illustrated example of FIG. 9B, the example redis resource 904 can be implemented using redis-pod.yml and redis-service.yml files. The example worker resource 906 consumes votes and stores them in memory (e.g., the db resource 908). In some examples, the worker resource 906 is a .NET Core worker, a Java® worker, or a .NET Core 2.1 worker. In the example of FIG. 9B, the worker resource 906 can be implemented using a worker-pod.yml file. The example db resource 908 stores votes. In some examples, the db resource 908 is a Postgres® or TiDB database backed by a Docker volume. The example db resource 908 can be implemented by db-pod.yml and db-service.yml files. The example result-app resource 910 is a web app to show the results of the votes in real time. In some examples, the result-app resource 910 is implemented in Node.js or ASP.NET Core SignalR. The example result-app resource 910 can be implemented using result-app-pod.yml and result-app-service.yml files.

FIG. 9B depicts an example dependency graph 950 of the example voting application of FIG. 9A. Example resources for the voting application represented in the dependency graph 950 include an example voting resource 952, an example worker resource 954, an example result resource 956, an example redis resource 958, and an example db resource 960. The example voting resource 952 is a front-end web app to present two or more options. The example worker resource 954 consumes and stores votes. The example result resource 956 is a web-app which shows the results of the voting in real time. The example redis resource 958 is a queue which collects new votes. The example db resource 960 stores the votes. In the illustrated example of FIG. 9B, the voting resource 952 corresponds to the voting-app resource 902, the worker resource 954 corresponds to the worker resource 906, the result resource 956 corresponds to the result-app resource 910, the redis resource 958 corresponds to the redis resource 904, and the db resource 960 corresponds to the db resource 908.

In the illustrated example of FIG. 9B, the arrow direction of a first resource pointing to a second resource indicates the first resource is dependent on the second resource (e.g., the opposite of FIGS. 3, 5, 7). For example, the example voting resource 952 and the example worker resource 954 are dependent on the example redis resource 958. Additionally, the example worker resource 954 and the example result resource 956 are dependent on the example db resource 960. In the illustrated example, the example redis resource 958 and the example db resource 960 are independent resources.

FIG. 10 is an example Yaml file 1000 that represents resources of the dependency graph 950 of FIG. 9B. The example Yaml file 1000 is represented as programming language pseudocode of machine-readable instructions that may be executed to determine resource deployment order of the resources in the dependency graph 950 of FIG. 9B. That is, the example Yaml file 1000 is a resource request file. In some examples, the Yaml file 1000 is stored in the dependency graph buffer 208. The example Yaml file 1000 includes example voting resource lines of code 1002, example redis resource lines of code 1004, example worker resource lines of code 1006, example db resource lines of code 1008, and example result resource lines of code 1010. In the illustrated example, the voting resource lines of code 1002 correspond to the voting resource 952, the redis resource lines of code 1004 correspond to the redis resource 958, the worker resource lines of code 1006 correspond to the worker resource 954, the db resource lines of code 1008 correspond to the db resource 960, and the result resource lines of code 1010 correspond to the result resource 956.

While an example manner of implementing the resource dependency manager 106 of FIG. 1 is illustrated in FIG. 2, one or more of the elements, processes and/or devices illustrated in FIG. 2 may be combined, divided, re-arranged, omitted, eliminated and/or implemented in any other way. Further, the example network interface 202, the example dependency database generator 204, the example dependency graph generator 206, the example dependency graph buffer 208, the example resource controller 210, the example dependency database 212, the example resource-based service interface 214, the example verification controller 216 and/or, more generally, the example resource dependency manager 106 of FIG. 2 may be implemented by hardware, software, firmware and/or any combination of hardware, software and/or firmware. Thus, for example, any of the example network interface 202, the example dependency database generator 204, the example dependency graph generator 206, the example dependency graph buffer 208, the example resource controller 210, the example dependency database 212, the example resource-based service interface 214, the example verification controller 216 and/or, more generally, the example resource dependency manager 106 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 202, the example dependency database generator 204, the example dependency graph generator 206, the example dependency graph buffer 208, the example resource controller 210, the example dependency database 212, the example resource-based service interface 214, the example verification controller 216 is/are hereby expressly defined to include a non-transitory computer readable storage device or storage disk such as a memory, a digital versatile disk (DVD), a compact disk (CD), a Blu-ray disk, etc. including the software and/or firmware. Further still, the example resource dependency manager 106 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 11:
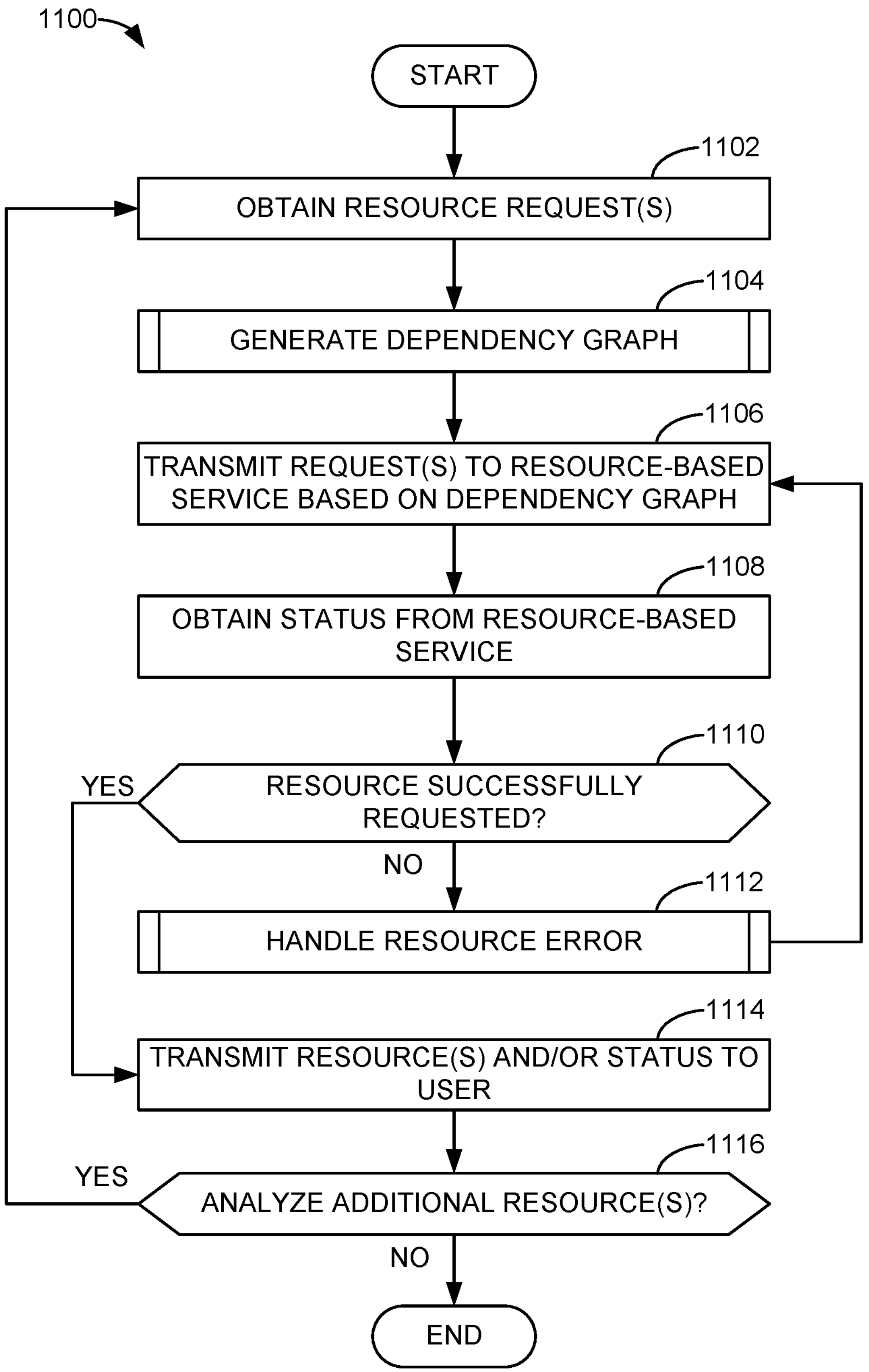
FIG. 11 is a flowchart representative of example machine readable instructions which may be executed to implement the example resource dependency manager of FIG. 2 to manage resource deployments in accordance with teachings of this disclosure.
Figure 12:
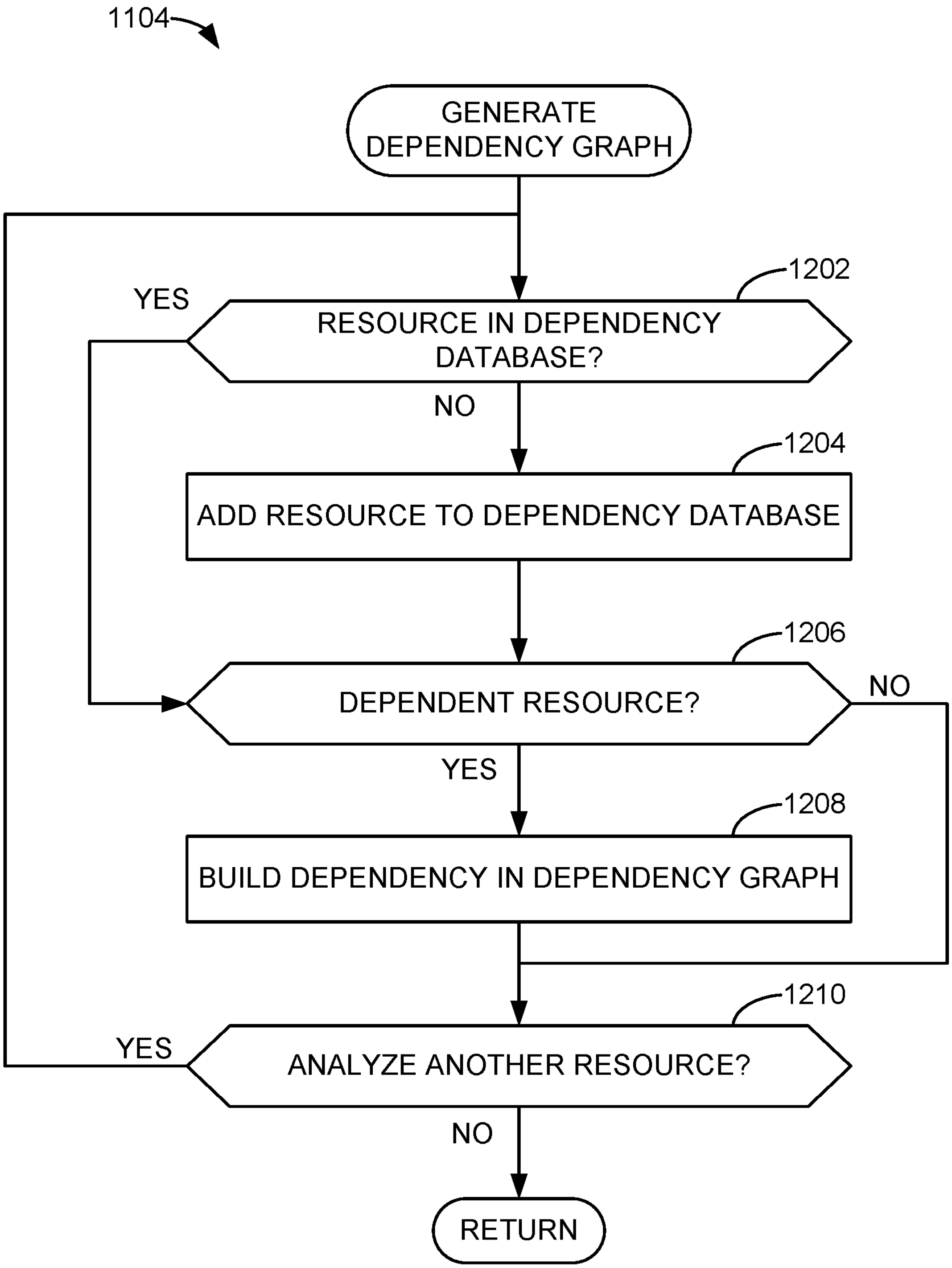
FIG. 12 is a flowchart representative of example machine readable instructions which may be executed to implement the example dependency graph generator of FIG. 2 to generate a dependency graph.
Figure 13:
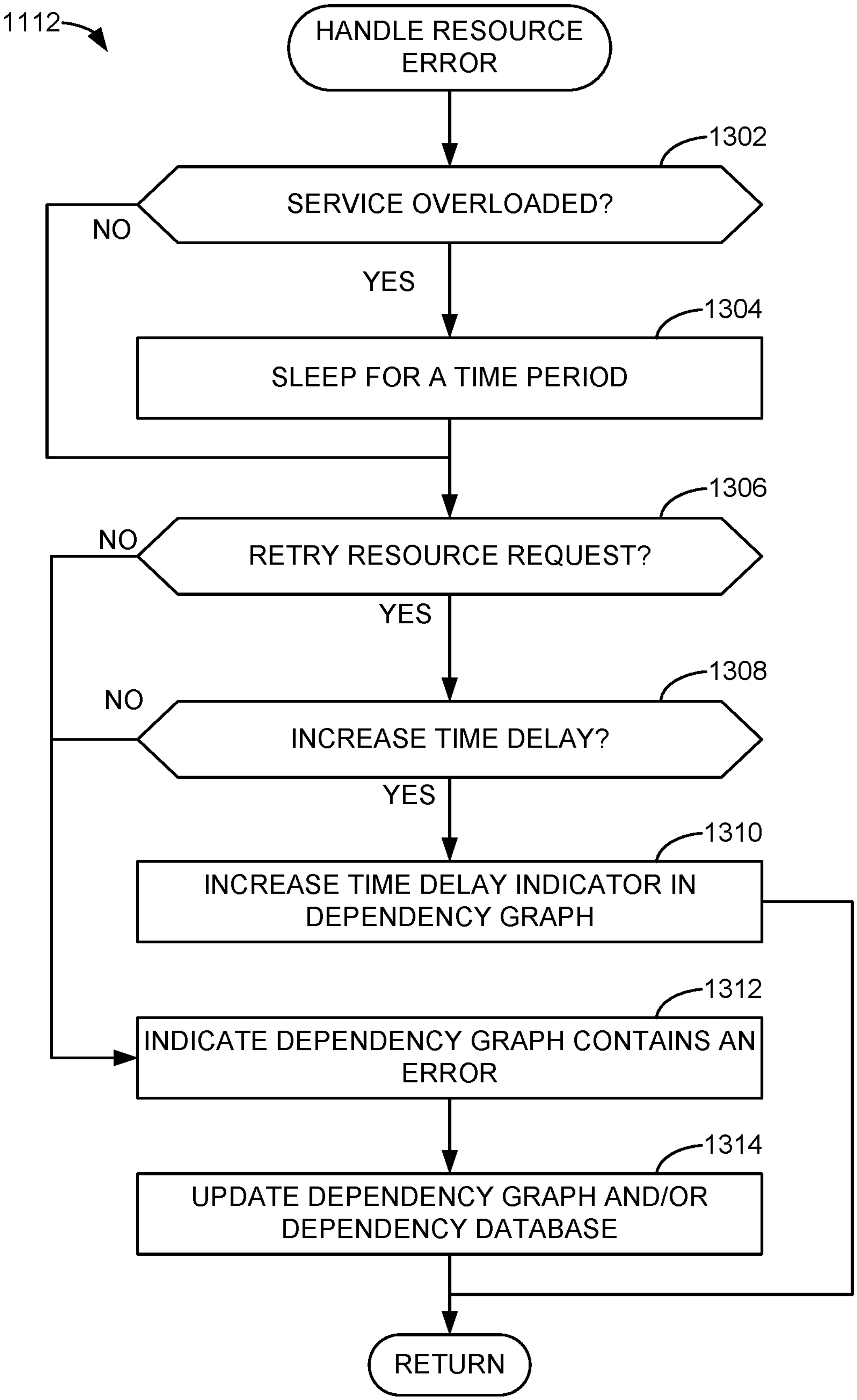
FIG. 13 is a flowchart representative of example machine readable instructions which may be executed to implement the example verification controller of FIG. 2 to handle a resource error.

Flowcharts representative of example hardware logic, machine readable instructions, hardware implemented state machines, and/or any combination thereof for implementing the resource dependency manager 106 of FIG. 2 is shown in FIGS. 11-13. The machine readable instructions may be one or more executable programs or portion(s) of an executable program for execution by a computer processor such as the processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowcharts illustrated in FIGS. 11-13, many other methods of implementing the example resource dependency manager 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 11-13 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 11 is a flowchart representative of example machine-readable instructions which may be executed to implement the example resource dependency manager 106 of FIGS. 1 and 2 to manage resource deployments. The example program 1100 of FIG. 11 begins at block 1102 at which the network interface 202 (FIG. 2) obtains one or more resource request(s). For example, the network interface 202 obtains a resource request specifying one or more resources from the user device 100 via the network 102 of FIG. 1.

At block 1104, the example dependency graph generator 206 (FIG. 2) generates a dependency graph. For example, the dependency graph generator 206 determines whether a resource of the resource request is a dependent resource based on the dependency database 212 (FIG. 2) and generates a dependency graph indicating dependencies between the resources of the resource request based on the dependency database 212. In the illustrated example, the dependency graph generator 206 can store the dependency graph in the dependency graph buffer 208. Example instructions that may be used to implement block 1104 to generate a dependency graph are described in more detail below in connection with FIG. 12.

At block 1106, the example resource controller 210 (FIG. 2) transmits the resource requests to the resource-based service 108 (FIG. 1) based on the dependency graph. For example, the resource controller 210 deploys the resource requests to the resource-based service 108 in an order according to the dependency graph. In some examples, the resource controller 210 deploys resource requests in parallel. In some examples, the resource controller 210 deploys a dependent resource at a relatively later time than an independent resource (e.g., based on a time delay). In the illustrated example, the resource controller 210 transmits resource deployments to the resource-based service 108 via the resource-based service interface 214 (FIG. 2).

At block 1108, the example resource-based service interface 214 obtains the status of the resource requests from the resource-based service 108. Examples of status indicators that may be obtained include the status is an error message, a success indication, etc.

At block 1110, the example verification controller 216 (FIG. 2) determines whether the resource was successfully requested. For example, the verification controller 216 receives a status indicator from the resource-based service 108 via the resource-based service interface 214 (e.g., at block 1108) indicating whether the resource(s) was/were requested successfully. In some examples, the verification controller 216 determines whether the time-based ordering of the resource(s) satisfies the dependency graph. If the example verification controller 216 determines the resources were requested successfully, the program 1100 continues to block 1114. If the example verification controller 216 determines the resources were not requested successfully, the program 1100 continues to block 1112, where the example verification controller 216 handles a resource error.

At block 1112, the example verification controller 216 handles a resource error. In examples disclosed herein, the verification controller 216 can determine the cause of the resource error as: the resource-based service 108 being overloaded, an inadequate time delay between resource requests of dependent resources, an error in the dependency database 212, etc. Example instructions that may be used to implement block 1112 to handle a resource error are described in more detail below in connection with FIG. 13. The program 1100 then returns to block 1106.

At block 1114, the example resource controller 210 transmits the resource(s) of the resource request and/or the status of the resource requests to the user device 100 via the example network interface 202. For example, the resource controller 210 may receive the status indicator of the resource request from the resource-based service 108 via the resource-based service interface 214. In some examples, the resource controller 210 transmits the status of the resource requests in real-time.

At block 1116, the example resource controller 210 determines whether to analyze additional resources. For example, the resource controller 210 determines to continue analyzing resources in response to an additional resource request. In some examples, the resource controller 210 determines to not continue analyzing resources in response to the resource request appending duration being greater than a threshold duration (e.g., a resource request, or number of retries, has been pending for a duration exceeding the threshold duration). If the example resource controller 210 determines to analyze additional resources, the program 1100 returns to block 1102. If the example resource controller 210 determines not to analyze additional resources, the program 1100 ends.

FIG. 12 is a flowchart representative of example machine-readable instructions which may be executed to implement the example resource dependency manager 106 of FIG. 2 to generate a dependency graph. The example instructions represented in FIG. 12 may be used to implement block 1104 of FIG. 11. The example program of FIG. 12 begins at block 1202 at which the dependency database generator 204 (FIG. 2) determines if a resource is in the dependency database 212 (FIG. 2). For example, the dependency database generator 204 selects a first resource of the resource request and searches the dependency database 212 for the first resource. The example dependency database generator 204 can use any suitable searching technique. If the example dependency database generator 204 determines the resource is in the dependency database 212, the program 1104 continues to block 1206. If the example dependency database generator 204 determines the resource is not in the dependency database 212, the program 1104 continues to block 1204 to add the resource to the dependency database 212.

At block 1204, the example dependency database generator 204 adds the resource to the dependency database 212. That is, the example dependency database generator 204 stores the resource in the dependency database 212 indicating whether the resource is an independent resource, a dependent resource, or both. In some examples, the dependency database generator 204 adds the resource to the dependency database 212 by executing a dependency model trained using machine learning. In some examples, the dependency database generator 204 adds the resource to the dependency database 212 in response to user input (e.g., input from an administrator, technician, etc.).

At block 1206, the example dependency graph generator 206 (FIG. 2) determines whether the resource is a dependent resource. For example, the dependency graph generator 206 accesses the dependency database 212 to determine whether the resource is a dependent resource. If the example dependency graph generator 206 determines the resource is not a dependent resource, the program 1104 continues to block 1210. If the example dependency graph generator 206 determines the resource is a dependent resource, the program 1104 continues to block 1208 to build a dependency in the dependency graph.

At block 1208, the example dependency graph generator 206 builds a dependency in the dependency graph. For example, the dependency graph generator 206 determines which resource the selected resource is dependent on. The dependency graph generator 206 can also determine a time delay indication associated with the resource dependency. The example dependency graph generator 206 can store the resource dependency and/or the time delay indication in the dependency graph buffer 208 (FIG. 2). For example, the dependency graph generator 206 may generate and store the section 804 of the Yaml file 800 of FIG. 8.

At block 1210, the example dependency graph generator 206 determines whether to analyze another resource of the resource request. For example, the dependency graph generator 206 may determine to analyze another resource if every resource of the resource request has not yet been analyzed. If the example dependency graph generator 206 determines to analyze another resource, the program 1104 returns to block 1202. If the example dependency graph generator 206 determines to not analyze another resource, the resource dependency manager 106 returns to block 1106 of FIG. 11.

FIG. 13 is a flowchart representative of example machine-readable instructions which may be executed to implement the example resource dependency manager 106 of FIG. 2 to handle a resource error. The example instructions represented in FIG. 13 may be used to implement block 1112 of FIG. 11. The example program of FIG. 13 begins at block 1302 at which the verification controller 216 (FIG. 2) determines whether the resource-based service 108 (FIG. 1) is overloaded. For example, the resource-based service 108 may send an indicator that the number of resource requests exceeds a request threshold. That is, resource dependency manager 106 detects an error message due to the resource-based service 108 not being able to fulfill the resource request due to it being overloaded (e.g., too many resource requests, etc.). Thus, the error indicator is not due to an error in the dependency graph. If the example verification controller 216 determines the service is not overloaded, the program 1112 continues to block 1306. If the example verification controller 216 determines the service is overloaded, the program 1112 continues to block 1304.

At block 1304, the example resource controller 210 sleeps for a time period. That is, the example resource controller 210 pauses, delays, etc. before retrying the resource request deployment. For example, the resource controller 210 may determine to sleep for 5 milliseconds, 10 milliseconds, etc.

At block 1306, the example resource controller 210 determines whether to retry the resource request deployment. For example, the resource controller 210 may determine to not retry the resource request deployment in response to the number of retries exceeding a redeployment threshold. For example, the redeployment threshold can be five, and five error results may indicate that there is an error with: the time delay, the dependency graph stored in the dependency graph buffer 208, etc. If the example resource controller 210 determines to not retry the resource request deployment, the program 1112 continues to block 1312. If the example resource controller 210 determines to retry the resource request deployment, the program 1112 continues to block 1308.

At block 1308, the example resource controller 210 determines whether to increase the time delay between resource request deployments. For example, the resource controller 210 may deploy resource requests based on a default time delay. In some examples, the default time delay between resource deployments is 5 milliseconds. In some examples, the time delay is configurable. In response to an error indication, the example resource controller 210 may determine to increase the time delay between resource deployments. For example, the resource dependency stored in the dependency graph of the dependency graph buffer 208 may be correct, but the resource controller 210 may have deployed the resource request of the dependent resource before the resource request of the corresponding independent resource was fulfilled (e.g., the time delay is not adequately long). If the example resource controller 210 determines to not increase the time delay, the program 1112 continues to block 1312. For example, in response to the time delay exceeding a time delay threshold, the resource controller 210 may determine to not increase the time delay. That is, a time delay exceeding the time delay threshold may be noticeable to the user (e.g., the user is able to perceive the time delay between resource requests). This may decrease the quality of user experience. If the example resource controller 210 determines to increase the time delay, the program 1112 continues to block 1310 to increase the time delay.

At block 1310, the example resource controller 210 increases the time delay indication in the dependency graph. For example, the resource controller 210 may increase the time delay indication from 5 milliseconds (e.g., the default time delay) to 10 milliseconds. However, in other examples the resource controller 210 may increase the time delay indication 2 milliseconds, 4 milliseconds, etc. The program 1112 then returns to block 1106 of FIG. 11.

At block 1312, the example verification controller 216 (FIG. 2) indicates the dependency graph contains an error. For example, the verification controller 216 indicates the dependency graph contains an error in response to the number of resource redeployment retrials being greater than the redeployment threshold, the time delay exceeding a time delay threshold, etc. For example, if the dependency graph does not include the correct resource dependency, increasing the time delay will still result in an error indication. The error notification may be generated by setting a flag that indicates the dependency graph contains an error after being checked by the verification controller 216. However, other methods of generating the notification may additionally or alternatively be used.

At block 1314, the dependency graph generator 206 updates the dependency graph stored in the dependency graph buffer 208 (FIG. 2) and/or the dependency database 212. For example, the dependency graph generator 206 may retrain the resource dependency model and execute the new resource dependency model to update the dependency graph. The example instructions of FIG. 13 end, and control returns to block 1106 of FIG. 11.

Figure 14:
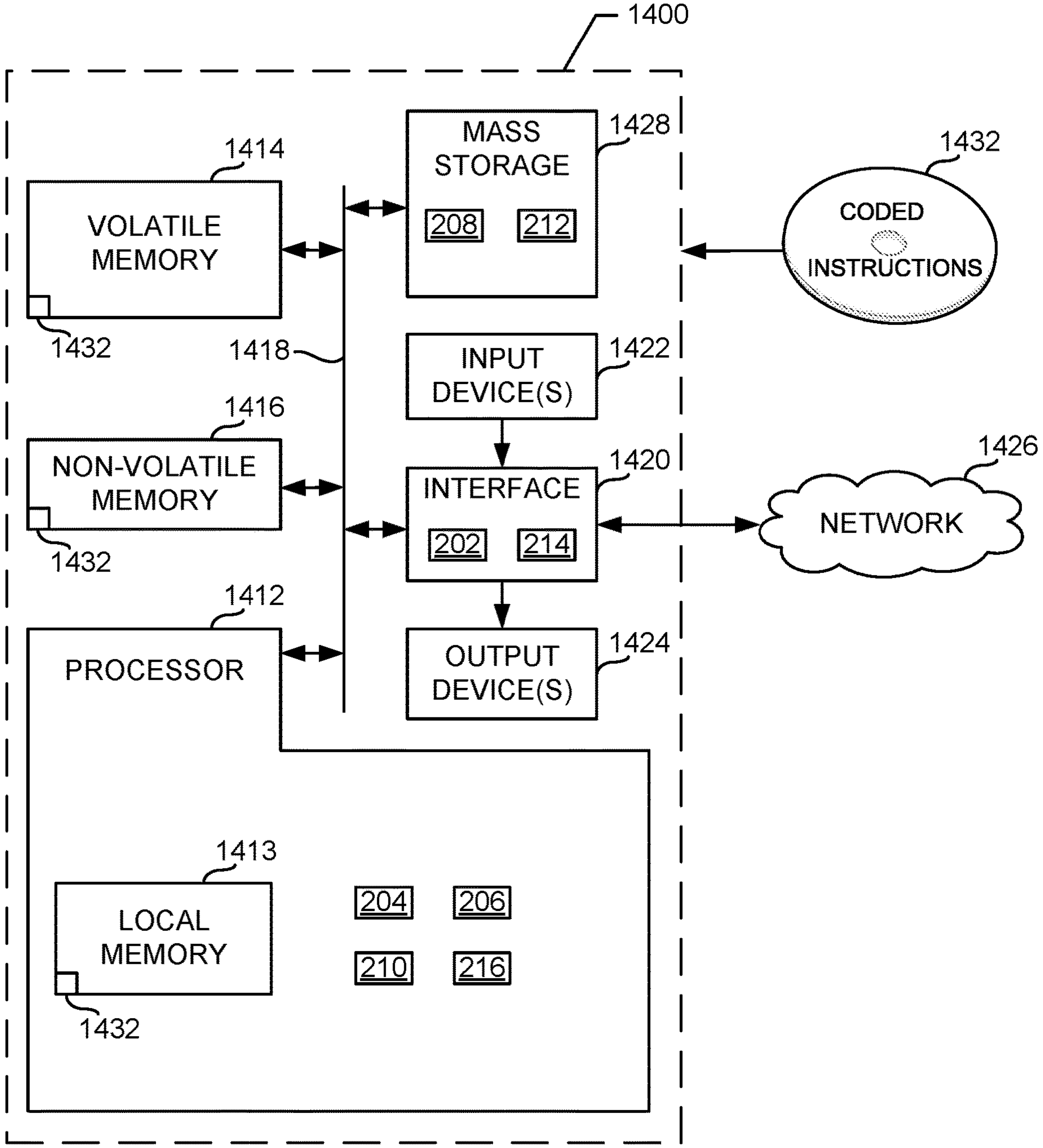
FIG. 14 is a block diagram of an example processing platform structured to execute the instructions of FIGS. 11, 12, and/or 13 to implement the example resource based manager of FIG. 1 to manage resource request deployments in accordance with teachings of this disclosure.

FIG. 14 is a block diagram of an example processor platform 1400 structured to execute the instructions of FIGS. 11-13 to implement the resource dependency manager 106 of FIG. 2. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example dependency database generator 204, the example dependency graph generator 206, the example resource controller 210, and the example verification controller 216.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1012. The input device(s) can be implemented by, for example, an audio sensor, a microphone, a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor. In the illustrated example, the interface 1420 implements the network interface 202 and the resource-based service interface 214.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives. In the illustrated example, the mass storage 1428 implements the dependency graph buffer 208 and the dependency database 212.

The machine executable instructions 1432 of FIGS. 11-13 may be stored in the mass storage device 1428, in the volatile memory 1414, in the non-volatile memory 1416, and/or on a removable non-transitory computer readable storage medium such as a CD or DVD.

Figure 15:
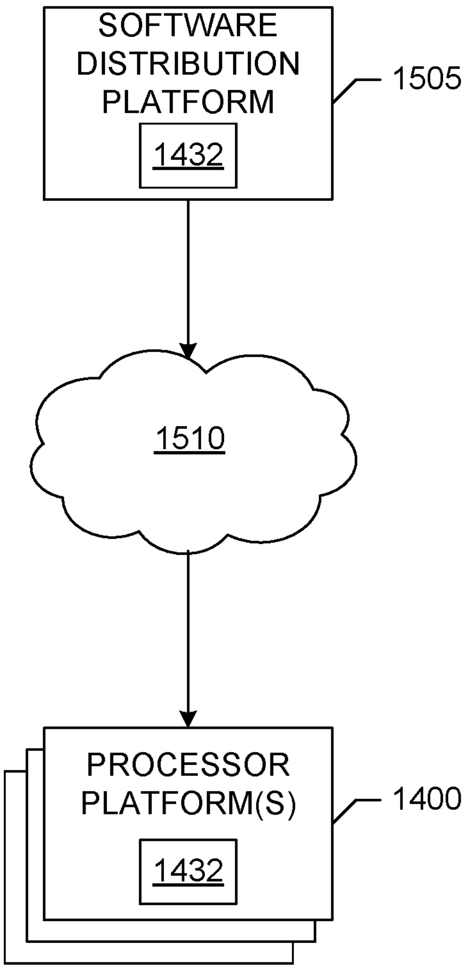
FIG. 15 is a block diagram of an example software distribution platform to distribute software (e.g., software corresponding to the example computer readable instructions of FIGS. 11-13) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1505 to distribute software such as the example computer readable instructions 1432 of FIG. 14 to third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1432 of FIG. 14. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the computer readable instructions 1432, which may correspond to the example computer readable instructions 1432 of FIGS. 11-13, as described above. The one or more servers of the example software distribution platform 1505 are in communication with a network 1510, which may correspond to any one or more of the Internet and/or any of the example networks 102, 1426 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1432 from the software distribution platform 1505. For example, the software, which may correspond to the example computer readable instructions 1432 of FIGS. 11-13, may be downloaded to the example processor platform 1400, which is to execute the computer readable instructions 1432 to implement the resource dependency manager 106. In some example, one or more servers of the software distribution platform 1505 periodically offer, transmit, and/or force updates to the software (e.g., the example computer readable instructions 1432 of FIG. 14) to ensure improvements, patches, updates, etc. are distributed and applied to the software at the end user devices.

From the foregoing, it will be appreciated that example methods, apparatus and articles of manufacture have been disclosed that manage resource request deployments. The disclosed methods, apparatus and articles of manufacture improve computing efficiency of a computing device by determining an order of resource deployments based on resource dependencies before the deployment of resource requests to a resource-based service. The disclosed methods, apparatus and articles of manufacture substantially reduce or eliminate the processor cycles for of troubleshooting resource requests by determining resource dependencies. The disclosed methods, apparatus and articles of manufacture are accordingly directed to one or more improvement(s) in the functioning of a computer.

Figure 16:
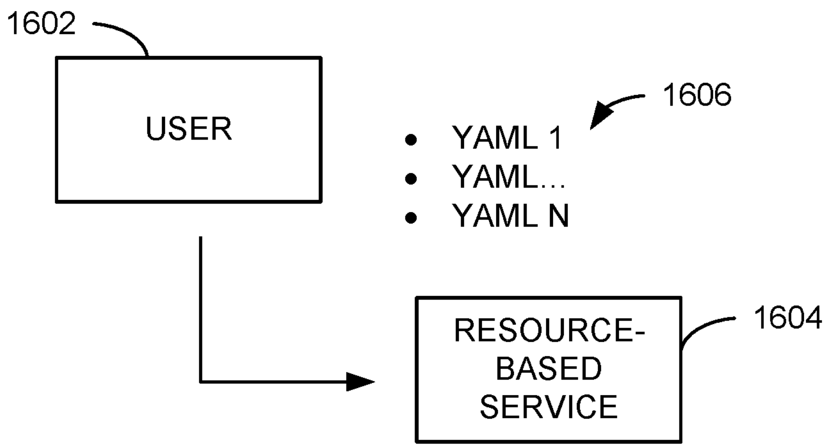
FIG. 16 is a block diagram of a prior technique to handle dependencies associated with resource deployment requests.

Examples disclosed herein are useful to overcome problems of prior techniques to handle dependencies associated with resource deployment requests. Such a prior technique is shown in FIG. 16. For example, when a user 1602 wants to create a complex structure (e.g., a high-level service, a component, etc.) in a given resource-based service 1604. In prior techniques, the user 1602 must deploy N number of Yaml files 1606 to the resource-based service 1604. In a first attempt, the user 1602 may decide to deploy all of the Yaml files 1606 in parallel. If the resource-based service 1604 is not clever enough, the resource-based service 1604 will start processing all of the deployments in parallel. For example, the deployment may include a resource I and a resource J. In prior techniques, as soon as resource I and resource J are deployed, the overall deployment will fail if there's a dependency between resource I and resource J (e.g., resource I is dependent on resource J, resource J is dependent on resource I).

As described above, in prior techniques the user 1602 checks and interprets the error message to determine the dependency between the resource I and the resource J. The user 1602 then retries the deployment. In some examples, it is possible that the resources I, J are sent in the proper order, but resource I takes more time to be deployed than the user 1602 expected. Thus, resource J starts to be deployed too early and the overall deployment fails again. In prior techniques, the user 1602 will again check and interpret the error message, repeating the deployment and interpretation process until much time, effort, and computing resources have been used for a successful deployment.

Figure 17:
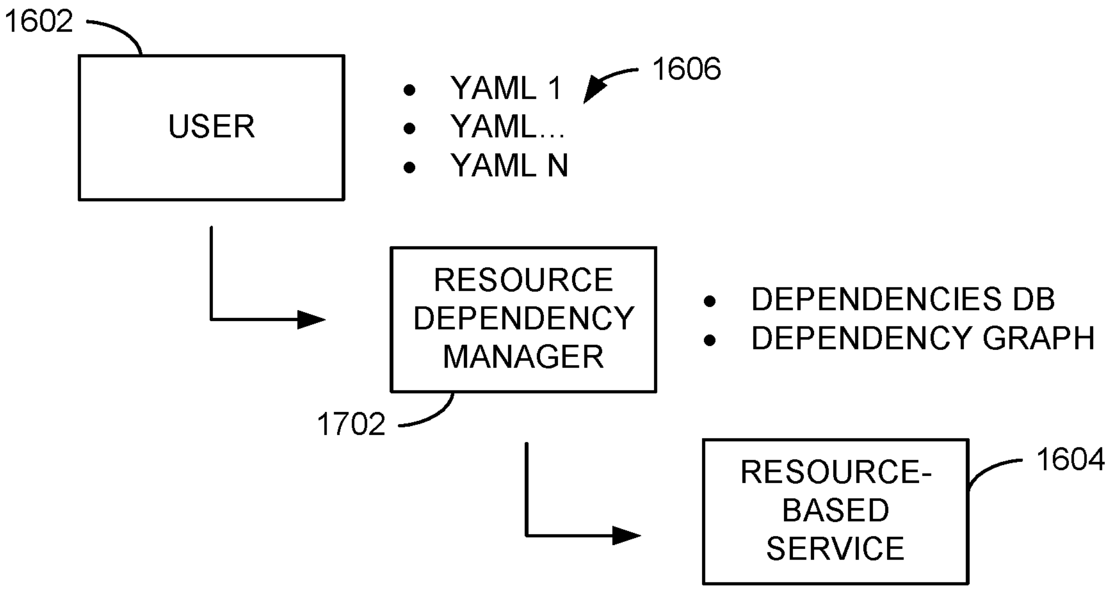
FIG. 17 is a block diagram of example techniques disclosed herein to handle dependencies associated with resource deployment requests using the example resource dependency manager of FIGS. 1 and 2.

Unlike prior techniques, examples disclosed herein provide a resource dependency manager 1702 (e.g., the resource dependency manager 106 of FIGS. 1 and 2) between the user 1602 and the resource-based service 1604 as shown in FIG. 17. For example, when the user 1602 wants to create the same complex structure (e.g., a high-level service, a component, etc.) in the same resource-based service 1604, the user 1602 deploys the N number of Yaml files 1606. In accordance with teachings of this disclosure, the N number of Yaml files 1606 are deployed into the resource dependency manager 1702. As described above, the resource dependency manager 1702 analyzes the content in the N number of Yaml files 1606, checks the dependencies database (e.g., the dependency database 212 of FIG. 2), and creates a dependency graph of the resources that the user 1602 requested. Then, following the dependency graph, the resource dependency manager 1702 (e.g., the resource controller 210 of FIG. 2 as described above) sends the proper requests for the resources to the resource-based service 1604. In examples disclosed herein, the requests may include extra logic such as retries in case of an error, waiting for previous resources to be reading, sleeping for a given amount of time to not overload the resource-based service 1604, etc. As described above, the resource dependency manager 1702 can collect the responses and/or statuses sent back by the resource-based service 1604 and send them back in substantially real time to the user 1602 once the original request is fulfilled.

In the example described above in connection with FIG. 16, if the resource I and the resource J are sent at the same time to the resource dependency manager 1702, the resource dependency manager 1702 will see the dependency between the resources I, J and act accordingly as described above. For example, the resource dependency manager 1702 can send the request for the resource I, wait until it's fulfilled (e.g., based on a time delay indication), and then send the request for the resource J. In this manner, examples disclosed herein can be used to deploy the complex structure successfully at the first attempt.

In examples disclosed herein, the resource dependency manager 1702 can be a standalone component or service that can be modified independently of the user 1602 and the resource-based service 1604 components (e.g., adding new dependency rules to the dependency database). The example resource dependency manager 1702 can also be a component moved to the user side via, for example, a client library, a CLI, and/or a proxy. In some examples, the resource dependency manager 1702 is a component integrated inside the resource-based service 1604.

Examples disclosed herein may be used with one or more different types of virtualization environments. Three example types of virtualization environments are: full virtualization, paravirtualization, and OS virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical RAM with virtual RAM). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource). In a typical paravirtualization system, a host OS (e.g., a Linux-based OS) is installed on the server hardware. A hypervisor (e.g., the XEN® hypervisor) executes on the host OS. VMs including virtual hardware resources are then deployed on the hypervisor. The hypervisor manages the association between the hardware resources of the server hardware and the virtual resources allocated to the VMs (e.g., associating RAM with virtual RAM). In paravirtualization, the guest OS installed in the VM is configured also to have direct access to some or all of the hardware resources of the server. For example, the guest OS may be precompiled with special drivers that allow the guest OS to access the hardware resources without passing through a virtual hardware layer. For example, a guest OS may be precompiled with drivers that allow the guest OS to access a sound card installed in the server hardware. Directly accessing the hardware (e.g., without accessing the virtual hardware resources of the VM) may be more efficient, may allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS may be installed in a VM of a full virtualization environment or a paravirtualization environment. The host OS of an OS virtualization system is configured (e.g., utilizing a customized kernel) to provide isolation and resource management for processes that execute within the host OS (e.g., applications that execute on the host OS). Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) may include multiple different virtualization environments. For example, a data center may include hardware resources that are managed by a full virtualization environment, a paravirtualization environment, and/or an OS virtualization environment. In such a data center, a workload domain may be deployed to any of the virtualization environments. Examples disclosed herein may analyze workload domains for any such virtualization environment to identify instances of non-compliance, and update workload domain configurations to deploy compliant workload domains.

Example methods, apparatus, systems, and articles of manufacture to handle dependencies associated with resource deployment requests are disclosed herein. Further examples and combinations thereof include the following:

Example 1 includes an apparatus to handle dependencies associated with resource deployment requests, the apparatus comprising a dependency graph generator to generate a dependency graph based on a resource request file specifying a first resource and a second resource to deploy to a resource-based service, the dependency graph representative of the first resource being dependent on a second resource, a resource controller to send a first request and a second request to the resource-based service based on the dependency graph, and in response to a verification controller determining that a time-based ordering of the first request relative to the second request satisfies the dependency graph, send the first request and the second request to a user device.

Example 2 includes the apparatus of example 1, wherein the resource controller is to request the first resource before the second resource.

Example 3 includes the apparatus of example 2, wherein the dependency graph generator is to store a time delay indication in association with the second resource in the dependency graph for deploying the second resource relative to the first resource, and the resource controller is to use the time delay indication to generate a time delay between requesting the first resource and the second resource.

Example 4 includes the apparatus of example 1, wherein the resource controller is to request the first resource and a third resource concurrently, the third resource not dependent on the first resource or the second resource.

Example 5 includes the apparatus of example 1, wherein the verification controller is to generate a status indicator in response to the verification controller determining an order of requests for resources by the resource controller satisfies the dependency graph.

Example 6 includes the apparatus of example 1, wherein the resource controller is to sleep for a time period in response to the verification controller determining that the resource-based service is overloaded, and send the first and second requests to the resource-based service after the time period.

Example 7 includes the apparatus of example 1, wherein the resource controller is to indicate the dependency graph includes an error in response to the verification controller detecting a threshold number of requests for resources that do not satisfy the dependency graph.

Example 8 includes the apparatus of example 7, further including a dependency database generator to change at least one dependency in a dependency database in response to the resource controller indicating the dependency graph includes the error.

Example 9 includes the apparatus of example 1, wherein the resource controller is to increase a time delay in response to the verification controller determining that the order of requests for resources does not satisfy the dependency graph.

Example 10 includes at least one non-transitory computer readable medium comprising instructions that, when executed, cause at least one processor to at least generate a dependency graph based on a resource request file specifying a first resource and a second resource to deploy to a resource-based service, the dependency graph representative of the first resource being dependent on a second resource, send a first request and a second request to the resource-based service based on the dependency graph, and in response to determining that a time-based ordering of the first request relative to the second request satisfies the dependency graph, send the first request and the second request to a user device.

Example 11 includes the at least one non-transitory computer readable medium of example 10, wherein the instructions, when executed, cause the at least one processor to request the first resource before the second resource.

Example 12 includes the at least one non-transitory computer readable medium of example 11, wherein the instructions, when executed, cause the at least one processor to store a time delay indication in association with the second resource in the dependency graph for deploying the second resource relative to the first resource, and use the time delay indication to generate a time delay between requesting the first resource and the second resource.

Example 13 includes the at least one non-transitory computer readable medium of example 10, wherein the instructions, when executed, cause the at least one processor to request the first resource and a third resource concurrently, the third resource not dependent on the first resource or the second resource.

Example 14 includes the at least one non-transitory computer readable medium of example 10, wherein the instructions, when executed, cause the at least one processor to generate a status indicator in response to determining an order of requests for resources satisfies the dependency graph.

Example 15 includes the at least one non-transitory computer readable medium of example 10, wherein the instructions, when executed, cause the at least one processor to sleep for a time period in response to determining that the resource-based service is overloaded, and send the first and second requests to the resource-based service after the time period.

Example 16 includes the at least one non-transitory computer readable medium of example 10, wherein the instructions, when executed, cause the at least one processor to indicate the dependency graph includes an error in response to detecting a threshold number of requests for resources that do not satisfy the dependency graph.

Example 17 includes the at least one non-transitory computer readable medium of example 16, wherein the instructions, when executed, cause the at least one processor to change at least one dependency in a dependency database in response to the resource controller indicating the dependency graph includes the error.

Example 18 includes the at least one non-transitory computer readable medium of example 10, wherein the instructions, when executed, cause the at least one processor to increase a time delay in response to determining that the order of requests for resources does not satisfy the dependency graph.

Example 19 includes a method to handle dependencies associated with resource deployment requests, the method comprising generating a dependency graph based on a resource request file specifying a first resource and a second resource to deploy to a resource-based service, the dependency graph representative of the first resource being dependent on a second resource, sending a first request and a second request to the resource-based service based on the dependency graph, and in response to determining that a time-based ordering of the first request relative to the second request satisfies the dependency graph, sending the first request and the second request to a user device.

Example 20 includes the method of example 19, further including requesting the first resource before the second resource.

Example 21 includes the method of example 20, further including storing a time delay indication in association with the second resource in the dependency graph for deploying the second resource relative to the first resource, and using the time delay indication to generate a time delay between requesting the first resource and the second resource.

Example 22 includes the method of example 19, further including requesting the first resource and a third resource concurrently, the third resource not dependent on the first resource or the second resource.

Example 23 includes the method of example 19, further including generating a status indicator in response to determining an order of requests for resources by the resource controller satisfies the dependency graph.

Example 24 includes the method of example 19, further including sleeping for a time period in response to determining that the resource-based service is overloaded, and sending the first and second requests to the resource-based service after the time period.

Example 25 includes the method of example 19, further including indicating the dependency graph includes an error in response to detecting a threshold number of requests for resources that do not satisfy the dependency graph.

Example 26 includes the method of example 25, further including changing at least one dependency in a dependency database in response to an indication that the dependency graph includes the error.

Example 27 includes the method of example 19, further including increasing a time delay in response to determining that the order of requests for resources does not satisfy the dependency graph.

Example 28 includes an apparatus to handle dependencies associated with resource deployment requests, the apparatus comprising means for generating a dependency graph based on a resource request file specifying a first resource and a second resource to deploy to a resource-based service, the dependency graph representative of the first resource being dependent on a second resource, means for controlling resource deployment requests to send a first request and a second request to the resource-based service based on the dependency graph, and send the first request and the second request to a user device in response to a time-based ordering of the first request relative to the second request satisfying the dependency graph.

Example 29 includes the apparatus of example 28, wherein the means for controlling is to request the first resource before the second resource.

Example 30 includes the apparatus of example 29, wherein the means for generating the dependency graph is to store a time delay indication in association with the second resource in the dependency graph for deploying the second resource relative to the first resource, and the means for controlling the resource deployment requests is to use the time delay indication to generate a time delay between requesting the first resource and the second resource.

Example 31 includes the apparatus of example 28, wherein the means for controlling the resource deployment request is to request the first resource and a third resource concurrently, the third resource not dependent on the first resource or the second resource.

Example 32 includes the apparatus of example 28, wherein the means for verifying is to generate a status indicator in response to the means for verifying determining an order of requests for resources by the means for controlling the resource deployment requests satisfies the dependency graph.

Example 33 includes the apparatus of example 28, wherein the means for controlling the resource deployment requests is to sleep for a time period in response to the means for controlling the resource deployment requests determining that the resource-based service is overloaded, and send the first and second requests to the resource-based service after the time period.

Example 34 includes the apparatus of example 28, wherein the means for controlling the resource deployment requests is to indicate the dependency graph includes an error in response to the means for verifying detecting a threshold number of requests for resources that do not satisfy the dependency graph.

Example 35 includes the apparatus of example 34, further including means for generating a dependency database to change at least one dependency in a dependency database in response to the means for controlling indicating the dependency graph includes the error.

Example 36 includes the apparatus of example 28, wherein the means for controlling the resource deployment requests is to increase a time delay in response to the means for verifying determining that the order of requests for resources does not satisfy the dependency graph.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. At least one non-transitory computer-readable medium comprising instructions to cause programmable circuitry to at least:

generate a dependency graph based on a resource request file specifying a first resource and a second resource to deploy to a resource-based service, the dependency graph representative of the first resource being dependent on the second resource;

sleep for a time period after determining that the resource-based service is overloaded;

provide a first request and a second request to the resource-based service based on the dependency graph after the time period; and after determining that a time-based ordering of the first request relative to the second request satisfies the dependency graph, cause transmission of at least one status of the first request and the second request to a user device.

2. The at least one non-transitory computer-readable medium of claim 1, wherein the instructions are to cause the programmable circuitry to request the first resource before the second resource.

3. The at least one non-transitory computer-readable medium of claim 1, wherein the instructions are to cause the programmable circuitry to request the first resource and a third resource concurrently, the third resource not dependent on the first resource or the second resource.

4. A method to handle dependencies associated with resource deployment requests, the method comprising:

generating a dependency graph based on a resource request file specifying a first resource and a second resource to deploy to a resource-based service, the dependency graph representative of the first resource being dependent on the second resource;

causing circuitry to sleep for a time period after determining that the resource-based service is overloaded;

transmitting a first request and a second request to the resource-based service based on the dependency graph after the time period; and after determining that a time-based ordering of the first request relative to the second request satisfies the dependency graph, transmitting at least one status of the first request and the second request to a user device.

5. The method of claim 4, further including requesting the first resource before the second resource.

6. The method of claim 4, further including requesting the first resource and a third resource concurrently, the third resource not dependent on the first resource or the second resource.

7. An apparatus to handle dependencies associated with resource deployment requests, the apparatus comprising:

means for generating a dependency graph based on a resource request file specifying a first resource and a second resource to deploy to a resource-based service, the dependency graph representative of the first resource being dependent on the second resource; and means for controlling resource deployment requests to:

sleep for a time period after a determination that the resource-based service is overloaded;

cause transmission of a first request and a second request to the resource-based service based on the dependency graph after the time period; and after determining that a time-based ordering of the first request relative to the second request satisfies the dependency graph, cause transmission of at least one status of the first request and the second request to a user device.

8. The apparatus of claim 7, wherein the means for controlling the resource deployment requests is to request the first resource before the second resource.

9. The apparatus of claim 7, wherein the means for controlling the resource deployment requests is to request the first resource and a third resource concurrently, the third resource not dependent on the first resource or the second resource.

* * * * *